US006678938B2

(12) United States Patent
McGlinchy et al.

(10) Patent No.: US 6,678,938 B2

(45) Date of Patent: *Jan. 20, 2004

(54) SYSTEM FOR FABRICATING MUNTIN BARS FROM SHEET MATERIAL

(75) Inventors: Timothy Bryan McGlinchy, Twinsburg, OH (US); Mohamed C. Khalfoun, Cleveland, OH (US); John Louis Grismer, Cuyahoga Falls, OH (US); Michael J. Gardner, Hudson, OH (US)

(73) Assignee: Glass Equipment Development, Inc., Twinsburg, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 10/409,791

(22) Filed: Apr. 8, 2003

(65) Prior Publication Data

US 2003/0188417 A1 Oct. 9, 2003

Related U.S. Application Data

(60) Continuation of application No. 10/120,040, filed on Apr. 10, 2002, now Pat. No. 6,618,926, which is a division of application No. 09/726,303, filed on Nov. 28, 2000, now Pat. No. 6,397,453, which is a division of application No. 08/797,031, filed on Feb. 7, 1997, now Pat. No. 6,173,484.

(51) Int. Cl.[7] .......................... B23Q 15/00; B23P 23/00

(52) U.S. Cl. .......................... 29/564.6; 29/417; 29/414; 29/564.7; 29/564.8; 72/181

(58) Field of Search ................................ 29/564, 564.6, 29/564.7, 564.8, 33 P, 417, 469.5, 897.35, 700, 791, 792, 799, 709, 711, 897, 897.3, 897.31, 897.34, 412, 414, 714; 52/204.61, 664, 667, 668, 456, 656.5, 656.8; 72/178, 181

(56) References Cited

U.S. PATENT DOCUMENTS

| | | | | | |
|---|---|---|---|---|---|
| 2,959,849 | A | | 11/1960 | Rubin | |
| 3,748,814 | A | * | 7/1973 | Cribben | 52/668 |
| 4,975,334 | A | | 12/1990 | Bullivant-Clark | |
| 4,989,384 | A | * | 2/1991 | Kinghorn et al. | 52/456 |
| 5,058,269 | A | | 10/1991 | May | |
| 5,088,307 | A | | 2/1992 | Cole | |
| 5,179,770 | A | | 1/1993 | Block et al. | |
| 5,295,292 | A | | 3/1994 | Leopold | |
| 5,361,476 | A | | 11/1994 | Leopold | |
| 6,173,484 | B1 | | 1/2001 | McGlinchy et al. | |
| 6,397,453 | B1 | * | 6/2002 | McGlinchy et al. | 29/564.6 |
| 6,438,819 | B1 | * | 8/2002 | McGlinchy et al. | 29/564.6 |

* cited by examiner

*Primary Examiner*—David P. Bryant

(74) *Attorney, Agent, or Firm*—Watts Hoffmann Co., LPA

(57) ABSTRACT

A system for fabricating muntin bars from sheet material. Sheet material in the form of thin ribbon stock is fed to a first forming station including a punching mechanism that punches the ribbon stock at a precisely predetermined location. The ribbon stock is delivered from the first forming station to a second forming station in the form of a rolling mill. The stock passes through a succession of forming rolls to produce a tube having a desired cross-sectional shape. The tube is delivered from the second forming station to a third forming station including a severing apparatus that severs the tube at a precisely predetermined location to produce a muntin bar. After severing, the muntin bar is engaged by a conveyor and moved to a desired location.

11 Claims, 15 Drawing Sheets

SYSTEM FOR FABRICATING MUNTIN BARS FROM SHEET MATERIAL

RELATED APPPLICATIONS

This is a continuation application of application Ser. No. 10/120,040, filed on Apr. 10, 2002, now U.S. Pat. No. 6,618,926, which is a divisional application of application Ser. No. 09/726,303, filed on Nov. 28, 2000, now U.S. Pat. No. 6,397,453, which is a divisional application of application Ser. No. 08/797,031, filed on Feb. 7, 1997, now U.S. Pat. No. 6,173,484.

FIELD OF THE INVENTION

The present invention relates to the fabrication of insulating glass units for windows, and more particularly to a system for fabricating muntin bars used in the construction of insulating glass units.

BACKGROUND ART

Windows constructed from multiple glass panes utilized "muntins" or "muntin bars" to secure the edges of the individual glass panes within the window sash. In many windows, muntins formed distinctive grid patterns which became associated with architectural styles of buildings containing the windows.

Modern windows formed by insulating glass units utilize single glass lights separated by an insulating dead air space. Where a particular architectural "look" is desired, a grid of muntin bars is fixed in the dead air space between the glass lights to simulate a multipane window. Typical muntin bars for insulating glass units are formed from decoratively coated interfitted metal tubes. The grids are anchored to the insulating glass unit periphery.

Constructing muntin bar grids for insulating glass units has been a labor intensive process. As a consequence, manufacturing such units, and thus windows formed by the units, has been costly and inefficient. Some efforts to mechanize the manufacture of muntin grids have been made. For example, machines for notching lengths of preformed tubular muntin bar stock at predetermined locations have been proposed. The muntin bar stock is cut into lengths for use in forming a grid for a given size insulating glass unit. The cut muntin bar stock is then fed into the notching machine and notches are formed at predetermined locations along each length. The grids are assembled by hand by interfitting the respective muntin bars at the notches.

The muntin bar stock is produced by roll forming decoratively coated sheet material such as aluminum or steel, in a known manner. Various sizes of the sheet material are used to form different size muntin bar stock. The roll forming machine has a series of rolls configured to form sheet material into elongated tubular muntin bar stock. A window manufacturer purchases the muntin bar stock size(s) needed to produce insulating glass units and, as described above, cuts the stock into lengths that are notched and assembled into grids for incorporation into the insulating glass units.

Conventional muntin bar constructions suffer from several drawbacks with respect to cost and efficiency. For example, insulating glass unit manufacturers are required to purchase and maintain an inventory of tubular muntin bar stock. In some instances, several different muntin bar stock sizes and colors are inventoried to produce grids for various insulating glass units. This necessitates dedicated muntin bar stock storage space and increases costs associated with inventory. In addition, the muntin bar stock must be cut into lengths the size of which depends on the size of the insulating glass units being manufactured. While dedicated machinery may be used to cut the stock, a machine operator is still required to perform at least some hand measurements in order to produce correctly cut-to-length muntin bars. Moreover, cutting the muntin bar stock frequently results in unusable scrap.

The cut-to-length muntin bars are then fed to a notching device to form notches that will be located at the muntin bar intersections. Although some machinery may be specialized to notch the bars for forming grids, a number of hand measurements typically must be made so as to produce correctly sized muntin bars with properly located notches. As a result, conventional construction of muntin bars and muntin bar grids requires the operator to perform a series of complicated measuring and fabricating steps, thereby increasing the difficulty and cost associated with such construction. The handling and notching procedures may also adversely affect the appearance of the muntin bar by damaging the muntin bar finish and denting or creasing the bar.

The present invention provides a new and improved system for fabricating muntin bars which is so constructed and arranged that stock sheet material is quickly and efficiently formed into individual muntin bars that include notches, or other structure, to permit the bars to be subsequently attached to form a grid, without requiring significant handling or mentation on the part of the individual fabricating the muntin bars. The invention provides a method and apparatus for continuously producing notched muntin bars from stock material; thus, a manufacturer is able to store coils of stock material rather than a supply of precut tubular muntin stock. Also, production of the muntin bars is automatically controlled to allow muntin bars to be custom formed for specific orders.

SUMMARY OF THE INVENTION

A preferred method of making a muntin bar includes steps of providing a supply of sheet material in the form of thin ribbon stock having a finished surface, feeding the ribbon stock to a first forming station comprising a punching mechanism, and punching the ribbon stock at a precisely predetermined location. The ribbon stock is delivered from the first forming station to a second forming station comprising a succession of forming rolls and is passed through a succession of forming roll nips to produce a tube having a desired cross-sectional shape. The tube is delivered from the second forming station to a third forming station comprising a severing apparatus and is severed at a precisely predetermined location. In preferred embodiments, after severing, a muntin bar handling station comprising a conveyor moves the muntin bar to a desired location. A preferred apparatus for making muntin bars comprises a ribbon stock supply station and first, second and third forming stations that process the stock into notched muntin bars.

BRIEF DESCRIPTION OF THE DRAWINGS

Other features and advantages of the invention will become apparent from the following detailed description of preferred embodiments thereof taken in conjunction with the accompanying drawings, wherein.

DETAILED DESCRIPTION OF PREFERRED EMBODIMENTS

Figure 1:
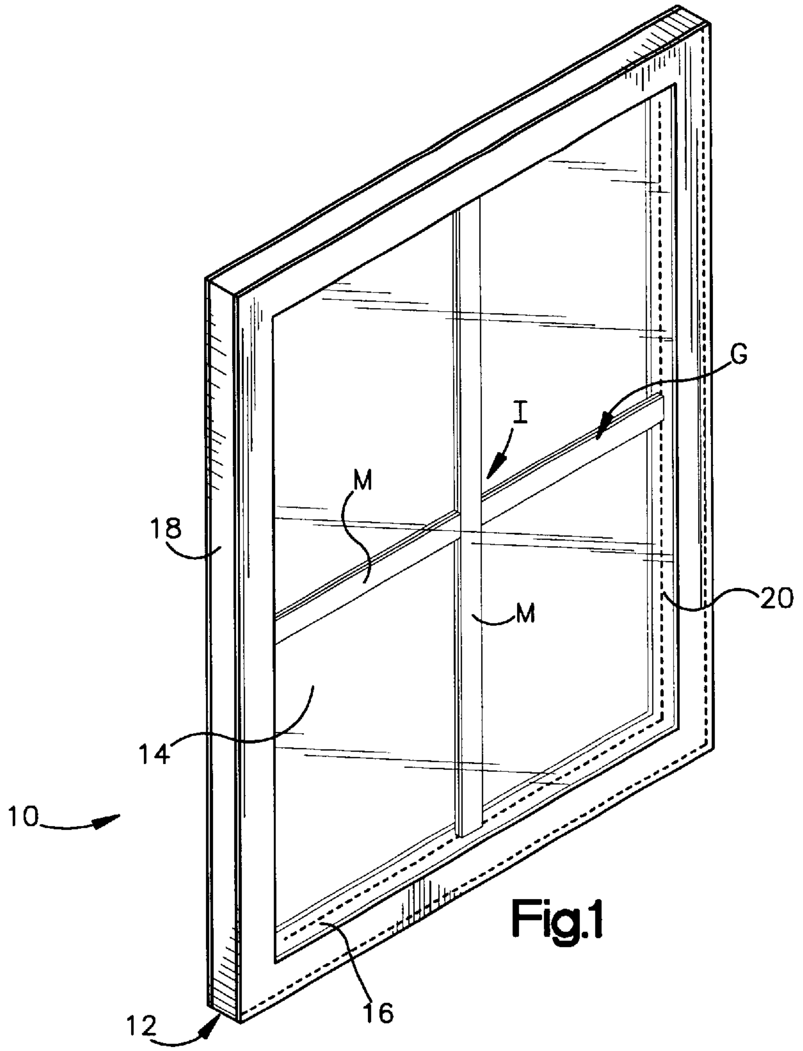
FIG. 1 is a perspective view of an insulating glass unit including a muntin bar grid constructed according to the invention.

FIG. 1 shows an insulating glass unit indicated generally by the reference numeral 10 comprising a spacer assembly 12 sandwiched between glass sheets, or lites, 14. The spacer assembly 12 includes a frame assembly 16 hermetically joined to the glass lites by a sealant 18 to form a closed dead air space 20 between the lites. The unit 10 is illustrated in FIG. 1 in condition for assembly into a window or door frame (not shown).

Figure 2:
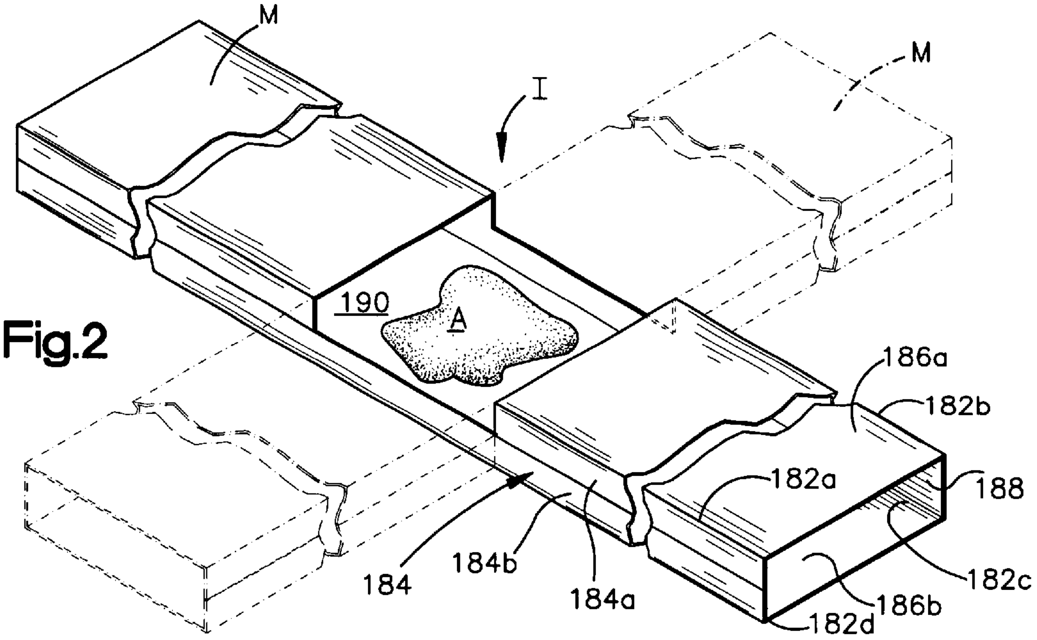
FIG. 2 is an enlarged perspective view of a portion of the muntin bar grid of the insulating glass unit of FIG. 1.

A muntin bar grid indicated at G is disposed between the glass lites to provide the unit 10 with the appearance of a multi-pane window. As seen in FIG. 2, the illustrated grid G is comprised of muntin bars M having mating notches 190 interfitted at an intersection I to form a lap joint. The bars are preferably, though not necessarily, secured together by a suitable adhesive indicated at A. The ends of the muntin bars M are secured to the interior of the spacer frame 16 by suitable fasteners as is known in the art. Muntin bars formed according to the invention may have any desired cross sectional configuration. In the illustrated embodiment, muntin bars M have a rectangular cross sectional configuration formed by major side faces, or panels, 186*a*, 186*b* and edge, or end, panels 184, 188.

Figure 3:
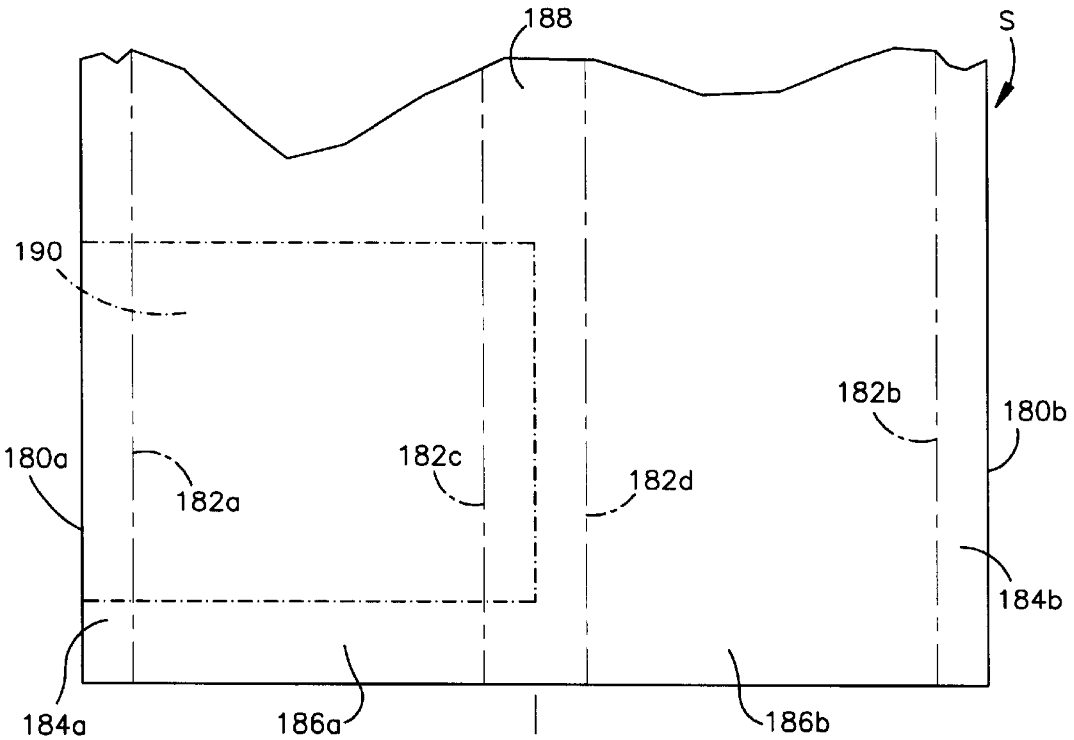
FIG. 3 is a plan view of a portion of stock material partially processed according to the invention.

FIG. 3 shows a length of stock material S suitable for being formed into a muntin bar M according to the invention. The stock material S, the opposite major surfaces of which may be coated or otherwise treated to produce a decorative color or pattern, is preferably in the form of thin metal ribbon stock, for example, aluminum or steel. According to the invention, the ribbon stock S is fed lengthwise through a muntin bar production line including a series of forming stations that transform the stock into the notched muntin bar M. The ribbon stock S includes opposite edges 180*a*, 180*b* that, along with fold lines 182*a*, 182*b* define edge panels 184*a*, 184*b*. When formed, the ribbon stock edges 180*a*, 180*b* abut so that edge panels 184*a*, 184*b* combine to form the end panel 184. The fold lines 182*a*, 182*b*, along with fold lines 182*c*, 182*d*, define the major panels 186*a*, 186*b*. The fold lines 182*c*, 182*d* define the end panel 188. The notch 190, shown in phantom, preferably extends inward from the edge 180*a* of the ribbon stock as illustrated in FIG. 3.

Figure 4:
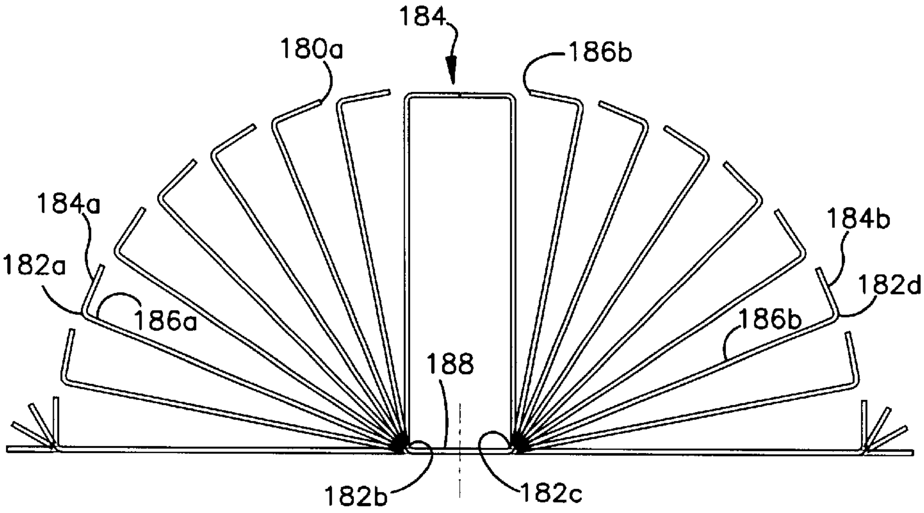
FIG. 4 is an elevation view schematically illustrating forming the stock material of FIG. 3 into a muntin bar.

FIG. 4 illustrates steps in the formation of the muntin bar M as the ribbon stock S is progressively folded along the fold lines discussed above. At the beginning of the folding process the ribbon stock S is a planar sheet. At the conclusion of the folding process, the ribbon stock S has been folded into a tube which, in the preferred and illustrated embodiment, has a rectangular cross section.

Figure 5:
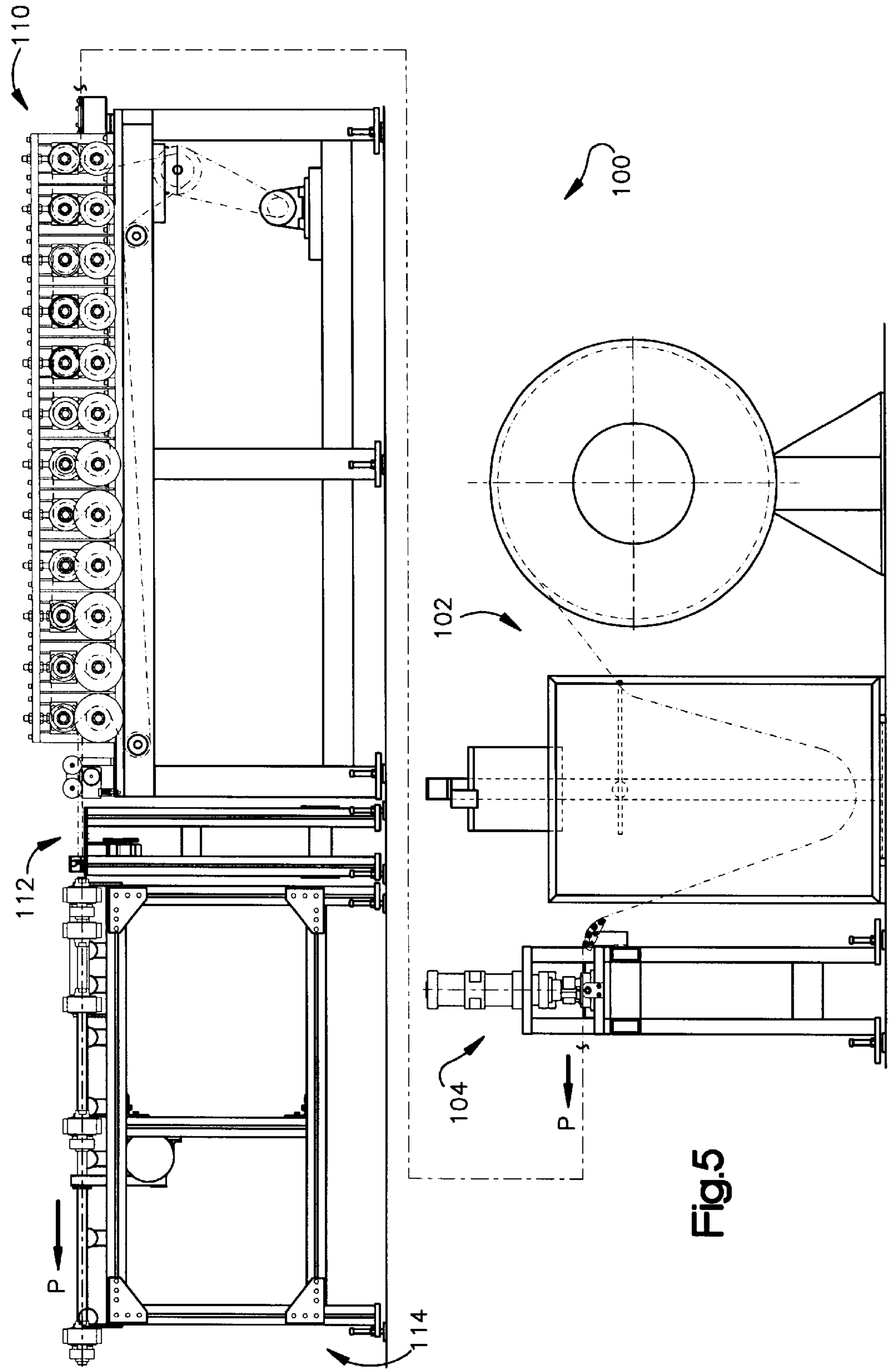
FIG. 5 is a front elevation view of a muntin bar production line constructed according to a preferred embodiment of the invention.
Figure 6:
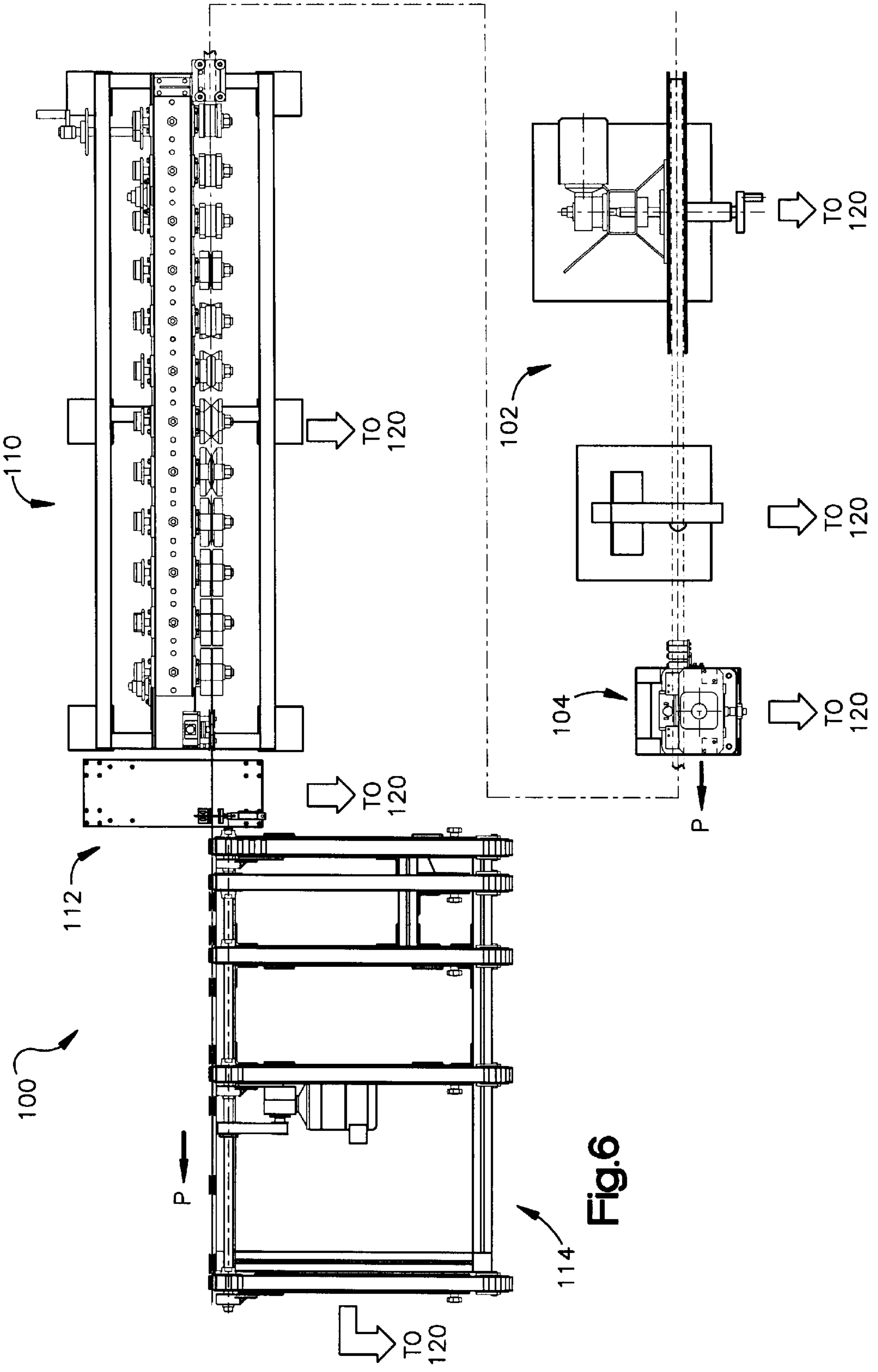
FIG. 6 is a plan view of the production line of FIG. 5.

With reference to FIGS. 5 and 6, a muntin bar production line constructed according to a preferred embodiment of the invention is shown in somewhat schematic fashion and indicated generally by the reference numeral 100. The production line 100 comprises a stock supply station 102 from which ribbon stock S is fed to a first forming station 104, a second forming station 110 to which stock from the station 104 is fed and formed into a tube, and a third forming station 112 that severs the tube to form an individual muntin bar. A muntin bar handling station, indicated at 114, moves the severed muntin bar to a desired location. A scheduler/motion controller unit 120 (FIG. 6) is preprogrammed to control the various stations of the production line 100 in order to govern muntin bar size, the stock feeding speeds in the line, activation of the forming stations, and other parameters involved in production.

The Stock Supply Station 102

Figure 7:
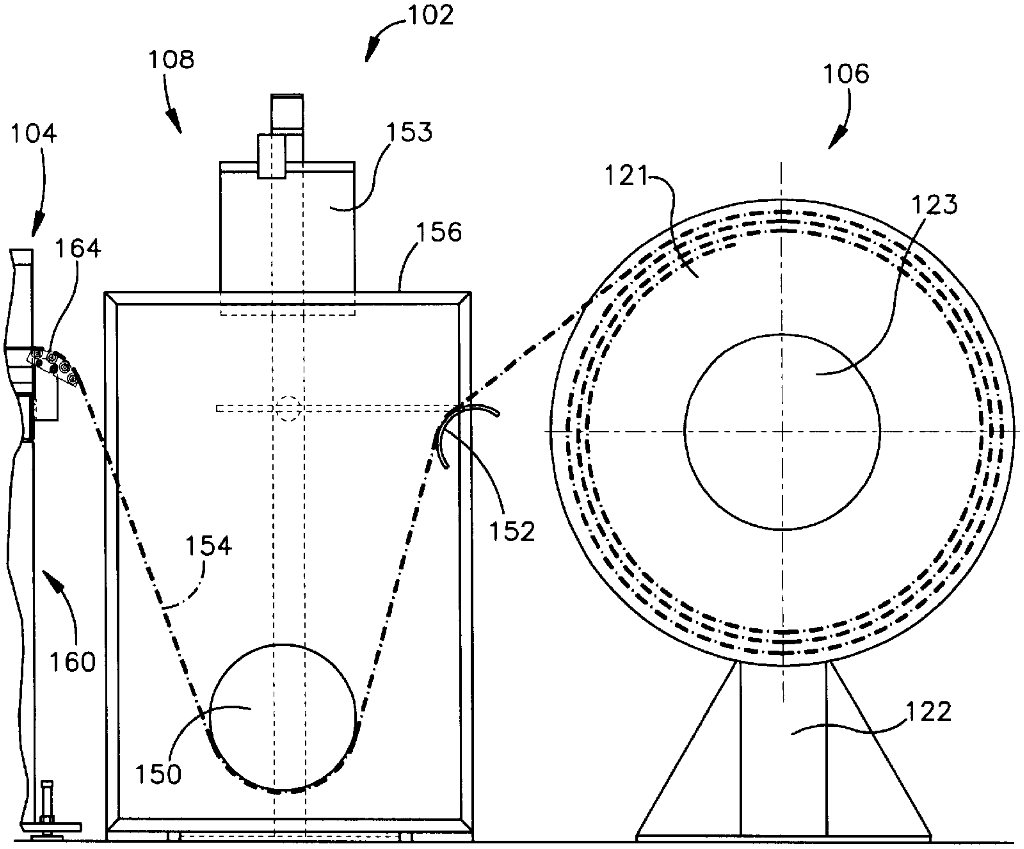
FIG. 7 is an enlarged front elevation view of a stock supply station forming part of the production line of FIG. 5.
Figure 8D:
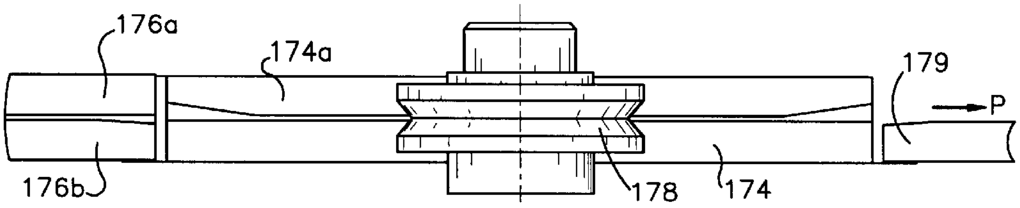
FIG. 8D is an enlarged elevation view of a portion of the first forming station of FIGS. 8A–8C.
Figure 8C:
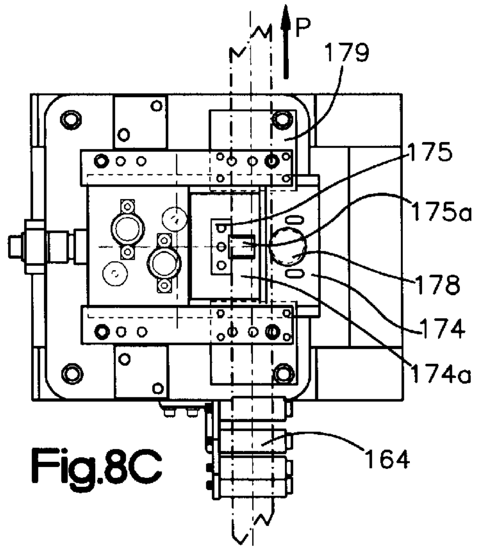
FIGS. 8A–8C are, respectively, an enlarged rear elevation view, end elevation view, and plan view of a first forming station forming part of the production line of FIG. 5.
Figure 8A:
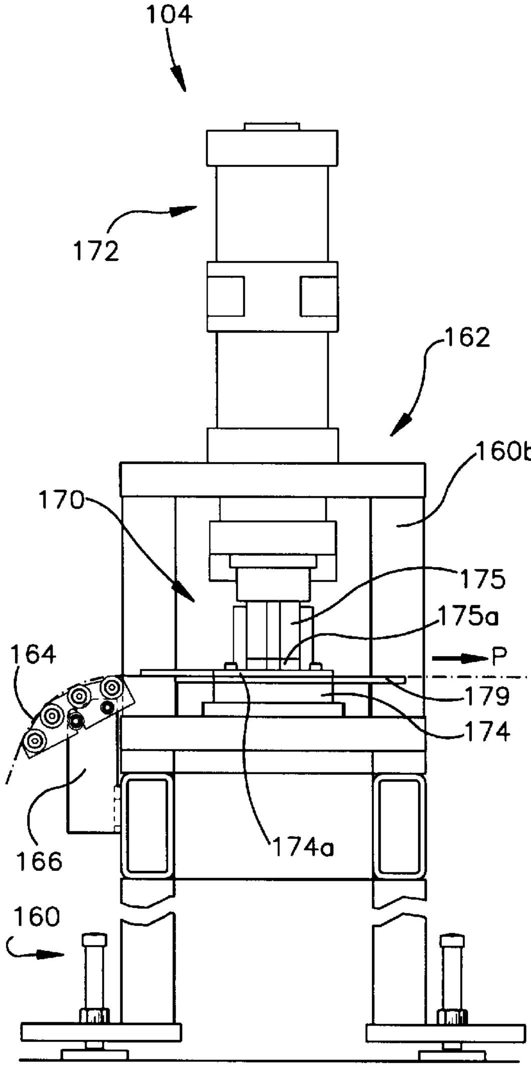
Figure 8B:
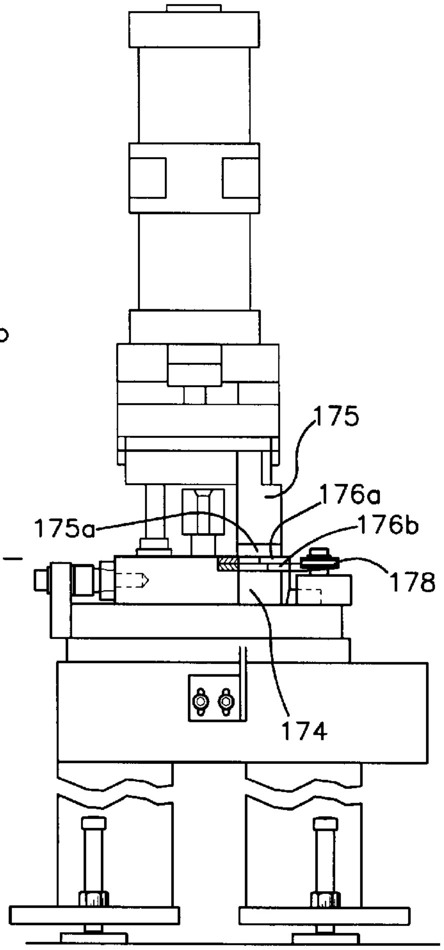

The stock supply station 102, shown somewhat schematically in FIG. 7, comprises a stock support 106 for the coiled ribbon stock S and a loop feed sensor 108. Although coiled ribbon stock is shown, a supply of flat sheets of the stock could be used as well. The coiled ribbon stock 121 is painted or otherwise finished on the side that forms the exterior of the muntin bar and thus must not be scratched, marred or otherwise damaged during production of the muntin bars. The ribbon stock is uncoiled from the support 106 and fed to the loop feed sensor 108. The ribbon stock support 106 comprises a vertical support column 122 extending upwardly from a base to a stub axle assembly 123 that supports the coiled stock. The projecting end of the axle assembly 123 that receives the coil of stock is provided with a device, e.g., an expandable mandrel (not shown), for securely clamping the coil. A drive motor and transmission assembly (not shown) drives the axle assembly 123 to feed stock from the station 102. The clamping device is preferably adjustable to receive coils having different widths depending upon the size of the muntin bars to be produced by the production line 100.

The loop feed sensor 108 coacts with the controller unit 120 to control the supply station 102 drive motor to prevent paying out excessive stock while assuring a sufficiently high feeding rate through the production line 100. The sensor 108 comprises a stand 150 positioned adjacent the stock support 106, an arcuate stock guide 152 for receiving the stock from the support 106, and a loop signal processing unit 153. Stock fed to the sensor 108 from the support 106 passes over the guide 152, droops in a catenary loop 154 and passes over a similarly configured arcuate stock guide 164 (which forms part of a first forming station, described below) upon exiting the sensor 108. The depth of the loop 154 is maintained between predetermined levels by the signal processing unit 153. The unit 153 includes an ultrasonic loop detector (not shown) which directs a beam of ultrasound against the lowermost segment of the stock loop. The loop detector detects the loop location from reflected ultrasonic waves and generates a loop location signal that is transmitted to the controller unit 120.

If desired, the ribbon stock support 106 may be constructed to permit the stock to be uncoiled in two different directions, thereby allowing either surface of the stock to form the exterior of the muntin bar. For example, the opposite surfaces of ribbon stock used to form muntin bars sometimes are coated or painted different colors (or have different patterns). The appearance of the muntin bar formed from such stock depends on the orientation of the stock when it is folded into a tubular muntin bar. In FIG. 7, the coil of ribbon stock 121 is rotated to supply the loop feed sensor 108, with the surface of the stock facing upward forming the exterior of the subsequently formed muntin bar. If it is desired to form a muntin bar in which the exterior is formed by the opposite surface of the stock, the coil may be removed from the support 106, rotated 180° about vertical column 122, and then replaced. The coil 121 then is rotated, with the opposite surface of the stock now facing upward so as to form the exterior of the subsequently formed muntin bar. The station 102 may include suitable rollers or other stock guides (not shown) to guide the stock when it is fed in the opposite direction from that shown.

The First Forming Station 104

The first forming station 104 is preferably in the form of a material removal station that receives ribbon stock from the loop sensor 108 and performs a precise punching operation on the stock. While the preferred and illustrated forming tool is a punch unit that forms a notch in the ribbon stock to facilitate attachment of the bars to form a grid, it should be recognized that the muntin attaching or engaging structure could be formed by tools that perform other processes, for example, drilling, milling, routing, laser cutting, plasma cutting, etc., processes.

In the preferred embodiment, as seen in FIGS. 8A–8D, the station 104 comprises a supporting framework 160 fixed to the factory floor adjacent the loop sensor, and a forming tool in the form of a punch unit 162 carried by the framework 160. The framework 160 includes a lower section that supports an upper section on which is mounted a stock guide 164 preferably including a plurality of rollers. The stock guide 164 supports the stock as it passes from the loop feed sensor 108 onto a ribbon travel path P extending through the stations 102, 104, 110, 112 and 114. The stock guide 164 is supported by a bracket 166 fixed to the framework 160.

The preferred punch unit 162 comprises a notching assembly 170 and an actuator assembly, or ram assembly, 172. The notching assembly 170 comprises a die, or anvil, 174 disposed beneath the stock travel path P. A keeper plate **174*a* is spaced above the upper surface of the die 174 a slight distance and the stock is received between the die and keeper plate. A punch, or hammer, 175 is disposed above the stock travel path P and is movable toward and away from the die 174 by the ram assembly 172. The keeper plate 174*a* has a recess or open area configured to receive the punch 175. The punch 175 includes a portion 175*a*** having a sharpened edge to punch through the stock, the edge preferably having a slightly chiseled shape; for example, the cutting edge may be offset 2½° with respect to horizontal.

A pair of upper and lower punch unit entry guides **176*a*, 176*b* are disposed at the inlet end of the punch unit and are spaced apart to receive the stock. The guides 176*a*, 176*b* preferably are made of plastic to permit smooth sliding of the stock. The lower guide 176*b* preferably is disposed such that its upper surface is located a small distance, e.g., 0.01", above the upper surface of die 174. An exit wear plate 179 is disposed at the outlet end of the punch unit and its upper surface also preferably is spaced a small distance above the die 174. As a result, the stock extends through the punch unit and is supported by the entry guides 176*a*, 176*b* and the wear plate 179 so as to be spaced slightly above the die 174 to prevent damage to the stock finish as it slides through the punch unit. As such, the stock, in effect, floats between the die 174 and the punch 175. In addition, the lateral edge of the stock opposite the portion punched engages a guide wheel 178 that includes a V-shaped groove which receives and supports the stock. See FIGS. 8A–8D**.

The ram assembly 172 is securely mounted atop the framework 160 and connected to a source of high pressure operating air via suitable conduits (not shown). The ram assembly 172 is operated from the controller 120 which outputs a control signal to a suitable or conventional ram controlling valve arrangement (not shown) when the stock has been positioned appropriately for punching. The controller 120 stops the rolling mill to stop the stock feed when the area of the stock to be notched is located between the die 174 and the keeper plate **174*a*. The ram assembly 172 is actuated and the punch 175 is driven downward through the keeper plate and the stock. Upon completion of punching, stock feed resumes. When the next location for removing material from the stock passing through the line 100 is reached, the stock feed is stopped again and the punching unit 162** is actuated.

The Second Forming Station 110

The second forming station 110 is preferably in the form of a rolling mill comprising a series of rolls for forming the ribbon stock received from first forming station 104 into a tube. FIG. 4 illustrates schematically the preferred manner in which the stock S is folded from its planar configuration by a series of steps to form a tube having a desired cross sectional configuration. In the preferred embodiment, the tube has a rectangular cross section; however, it will be recognized that the tube may be various shapes. Thus, different roll configurations or sizes may be used to vary the shape, height or width of the finished muntin bar (along with any desired modifications to the process carried out by the first forming station 104).

As seen in FIG. 4, in the preferred embodiment, the edge panels 184*a*, 184*b* are progressively bent upward from the major panels 186*a*, 186*b*. The major panels 186*a*, 186*b* then are progressively bent upward toward each other until the edges 180*a*, 180*b* abut, with the edge panels 184*a* and 184*b* combining to form the end panel 184. The finished configuration of the tube thus is closed about its periphery.

Figure 9:
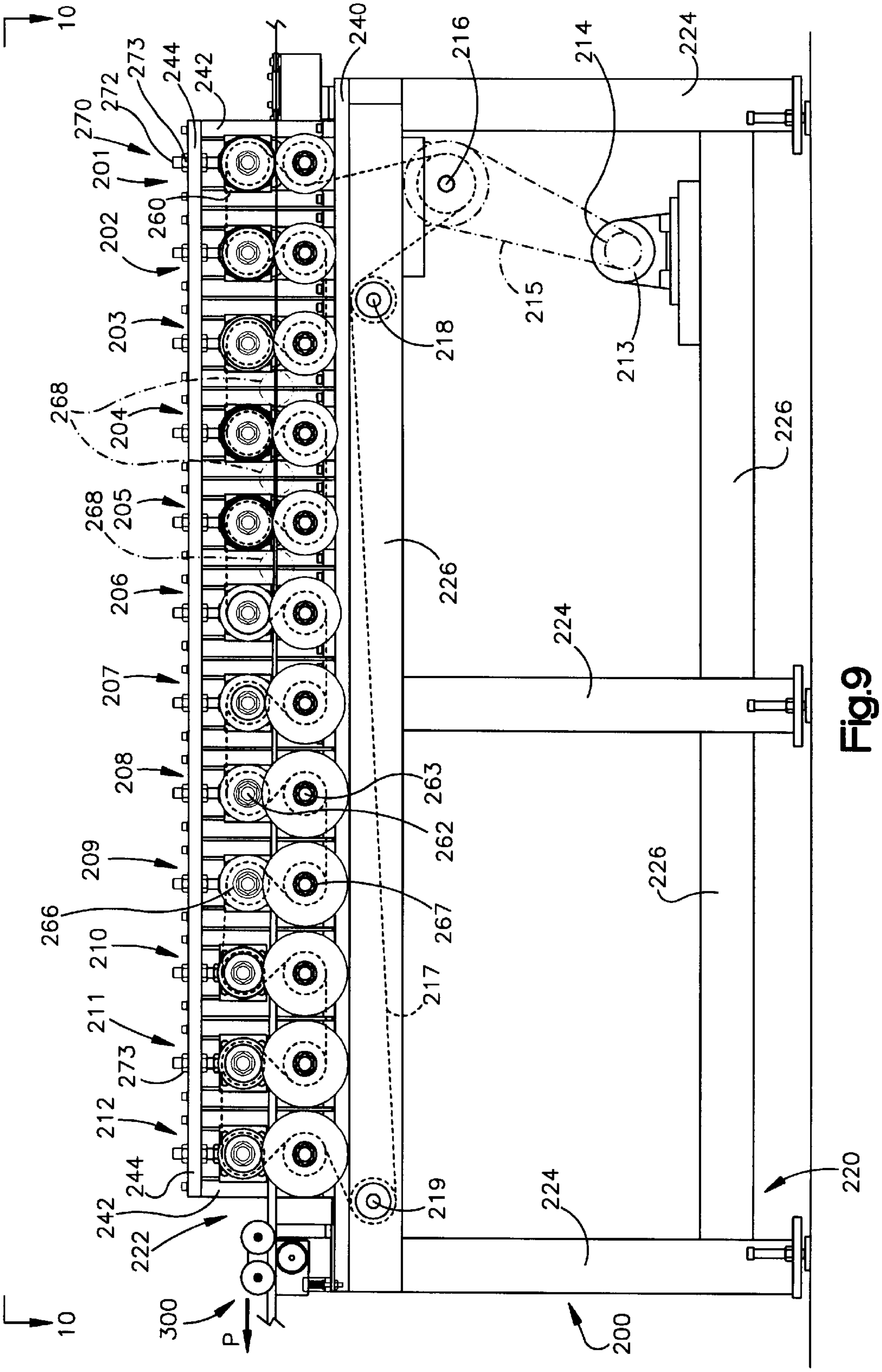
FIG. 9 is an enlarged front elevation view of a second forming station forming part of the production line of FIG. 5.
Figure 10:
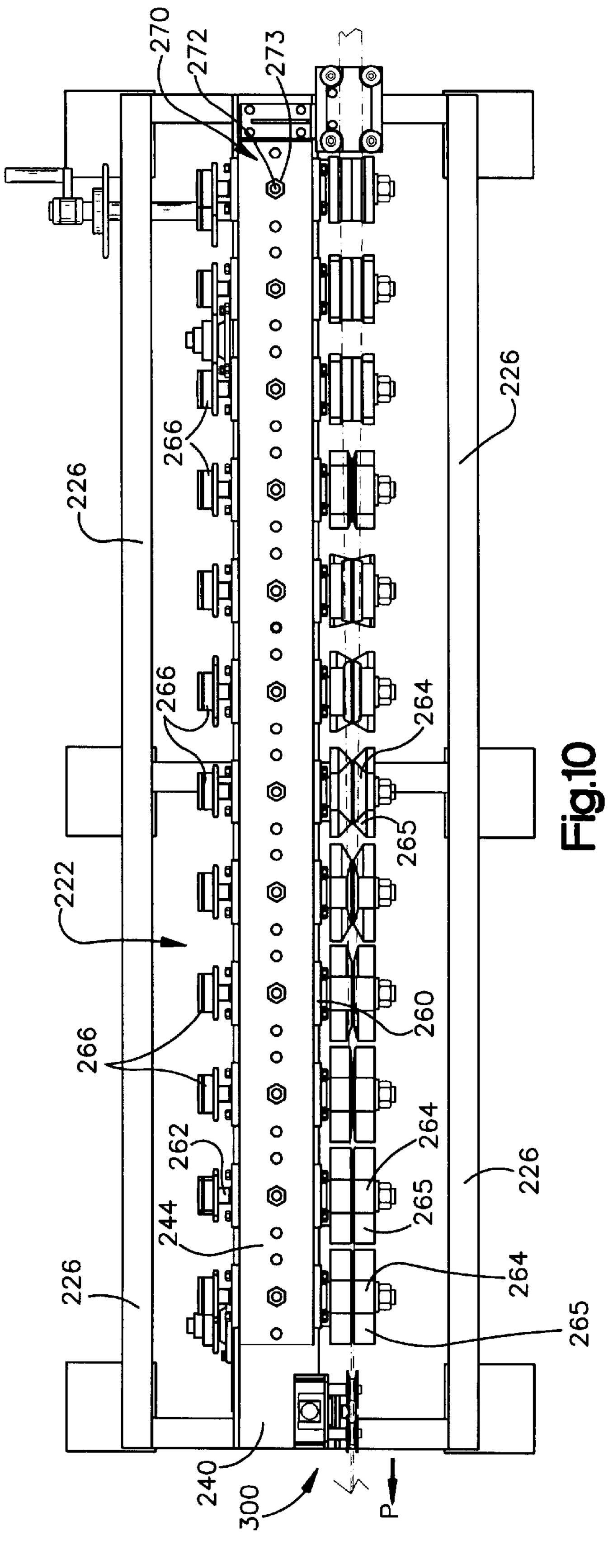
FIG. 10 is a plan view of the forming station of FIG. 9 seen approximately from the plane indicated by the line 10—10 in FIG. 9.

In the preferred embodiment, as seen best in FIGS. 9 and 10, the second forming station 110 comprises a support frame 200, roll assemblies 201–212 carried by the frame, and a drive transmission system for driving the roll assemblies.

The support frame 200 comprises a base 220 fixed to the factory floor and a roll supporting assembly 222 mounted atop the base. The base 220 is positioned in line with the stock travel path P immediately adjacent the first forming station 104. Similarly, the roll supporting assembly 222 extends along opposite sides of the stock travel path P with the stock travel path P extending centrally therethrough. The base section 220 comprises legs 224 and support rails 226 extending along opposite lateral sides of the rolling mill at the upper and lower ends of the legs 224. The roll supporting assembly 222 supports the roll assemblies 201∝212.

The roll supporting assembly 222 comprises a lower support beam 240 and an upper support beam 244 each extending along substantially the entire length of the rolling mill beneath the roll assemblies 201–212. A series of spaced apart vertical upwardly extending stanchions 242 are fixed to the beams 240 and 244, one pair of vertically aligned mill rolls being received between each successive pair of the stanchions 242. The upper support bar 244 is illustrated as being fixed to the stanchions by heavy machine screws, but nuts and bolts could also be used. Each pair of rolls extends between a respective pair of stanchions 242 so that the stanchions provide support against relative roll movement in the direction of the stock travel path P. The stanchions 242 also secure the rolls together for assuring adequate engagement pressure between the rolls and stock passing through the roll nips.

In the preferred embodiment, each roll assembly 201–212 is formed by a pair of vertically aligned upper and lower rolls that define a single "pass" of the rolling mill. Each roll assembly 201–212 comprises a bearing housing 260, upper and lower roll shafts 262, 263 extending through a bearing in the housing 260, and upper and lower stock forming rolls 264, 265 respectively disposed on the inwardly projecting ends of the shafts 262, 263. The bearing housings 260 are captured between adjacent stanchions 242. Drive pulleys or sprockets 266, 267 are respectively disposed on the ends of shafts 262, 263 disposed at the rear of the rolling mill (FIG. 10) and project laterally outwardly from the support unit.

One or more guide rolls, indicated in phantom at 268, may be provided adjacent the forming rolls of one or more passes of the rolling mill to ensure the ribbon stock is moved through the roll nips without bending or kinking. The guide rolls preferably are disposed between selected adjacent passes of the rolling mill to support the stock as it extends between the passes. The guide rolls may be disposed in pairs, i.e., one roll on each side of the stock travel path P between adjacent passes of the mill to engage both sides of the stock, or a single guide roll may be provided between adjacent passes to engage only one side (preferably the side that is notched) of the stock. It should be recognized that whether the use of guide rolls 268 is desirable or necessary will depend upon various factors such as the width of the stock, the thickness of the stock, and the type and strength of the stock material. Thus, the guide rolls may be useful in some applications but not others.

The upper support beam 244 of the roll supporting assembly carries a nut and screw adjustment mechanism 270 associated with the upper roll of each roll assembly 201–212 for adjustably changing the position of the upper roll. The lower roll 265 of each roll assembly is fixed in position on the lower support beam 240. The mechanism 270 comprises a screw 272 threaded into the upper roll bearing housing 260 and a lock nut 273 engaging the screw. The nut 273 is rotated to move its associated screw 272 and positively adjust the position of the bearing housing 260 and the upper roll 264 relative to its corresponding lower roll 265. The adjustment mechanisms 270 enable the upper roll in each roll pair to be moved toward or away from the lower roll which also increases or decreases the pressure that the rolls exert on the stock.

The rolling mill is provided with a drive transmission system for rotating the rolls. The preferred and illustrated drive transmission system comprises a motor driven chain and sprocket assembly; however, it will be appreciated that other drive systems may be used, e.g., a system employing gears, belts, etc.

The drive transmission system includes a motor 213 fixed to the support rail 226 of base 220 by any suitable means. The motor 213 is preferably an electric servomotor driven from the controller unit 120. As such, the motor speed can be continuously varied through a wide range of speeds without appreciable torque variations. The motor 213 is preferably disposed on its side with its output shaft extending horizontally and laterally relative to the stock travel path P. The motor 213 is coupled to the roll assemblies 201–212 so that the roll assemblies are positively driven whenever the servomotor is operated.

Referring to FIG. 9, the motor output shaft drives a sprocket 214 which in turn drives a chain 215 to rotate a sprocket fixed to a shaft 216 disposed beneath the inlet end of the rolling mill. A secondary drive chain 217 is reeved around another sprocket fixed to the shaft 216 and also around the sprockets 266, 267 of the rolls in each assembly 201–212 (as well as a pair of idler sprockets 218, 219). One or more of the sprockets may be adjustably mounted to the frame to adjust the tension in the chains 214, 217, for example, by brackets that are slidable along the frame and fixed at a desired position.

Accordingly, whenever motor 213 is driven, the rolls 264, 265 of each roll assembly are positively driven in unison. The rolls in each assembly 201–212 are driven so as to have the same surface speed. In addition, the speed of the rolls increases by a slight amount progressing from assembly 201 to assembly 212 which serves to slightly tension the stock being pulled through the rolling mill.

The forming rolls 264, 265 of roll assemblies 201–212 are configured to progressively form the ribbon stock from its planar configuration into a tube which, in the illustrated embodiment, has a rectangular cross section. The first three passes of the rolling mill, i.e., roll assemblies 201–203, bend the edge panels 184 upward about fold lines 182*a* (FIGS. 3 and 4). The roll assemblies 204–212 then progressively bend the major panels 186*a*, 186*b* upward until the edges 180*a*, 180*b* meet to form a tube closed about its periphery. The tube formed by the second forming station 110 has one or more notches 190 precisely located at predetermined locations. It should be appreciated that the number of forming roll assemblies and the configuration of the forming rolls may be varied from that shown in the drawings, for example, in order to produce tubes having different configurations.

The Third Forming Station 112

Figure 11C:
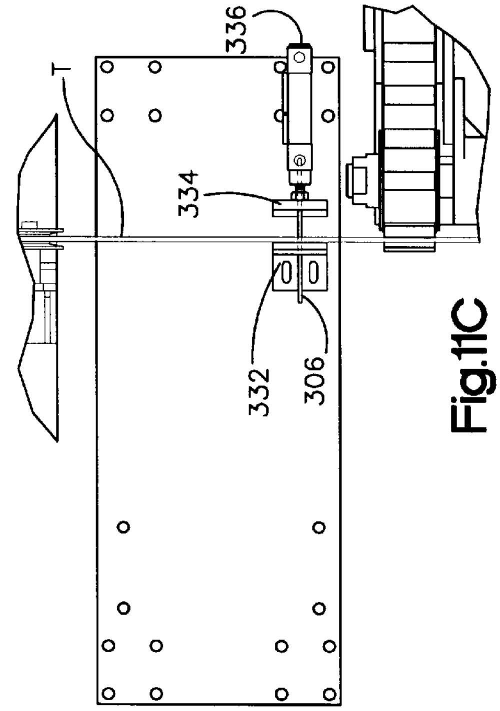
FIGS. 11A–11C are, respectively, an enlarged front elevation view, end elevation, and plan of a third forming station forming part of the production line of FIG. 5.
Figure 11B:
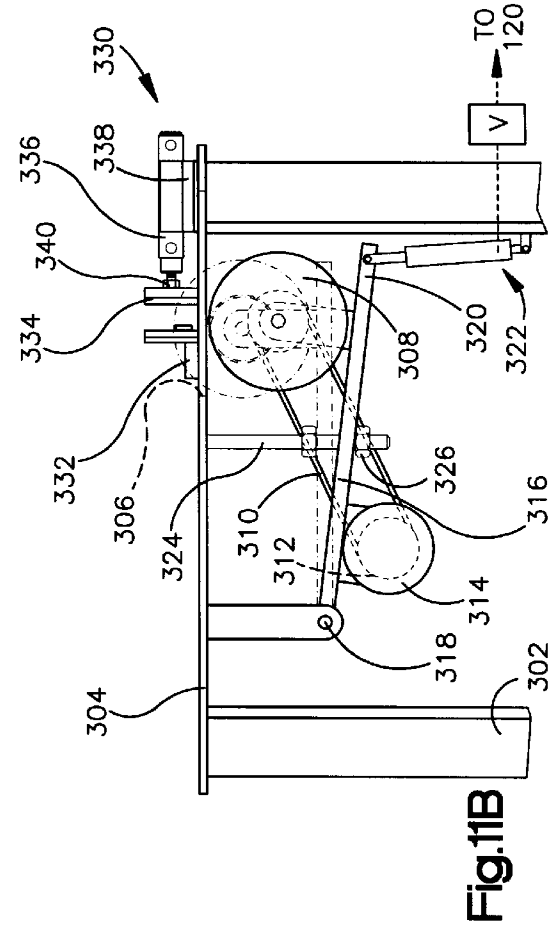
Figure 11A:
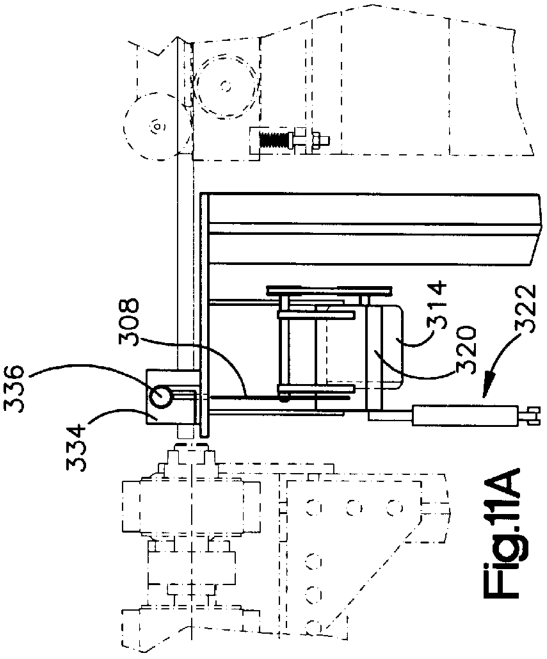

The third forming station 112 preferably is in the form of a severing station that severs the tube exiting the forming station 110 into an individual muntin bar. In the preferred embodiment, as seen in FIGS. 11A–11C, the station 112 comprises a frame 302 that is fixed to the factory floor adjacent the forming station 110 and supports a platform 304. The platform 304 is disposed alongside the forming station 110 at a height that permits the tube exiting the station 110 to slide above the upper surface of the platform 304. The platform includes a slot 306 through which a cutting device passes in order to cut the tube as the tube rests at a height so as to not contact the platform (in order to prevent damaging the finish).

In the illustrated embodiment, the cutting device is a circular saw blade 308 attached to a sprocket that is rotated by a belt 310 driven by a sprocket 312 connected to the output shaft of a motor 314. It should be recognized that other cutting devices and/or drive mechanisms could be utilized to sever the tube formed by the station 110. The particular characteristics of the saw blade, e.g., the material forming the blade, the size of the blade, the number and shape of the cutting teeth, etc., may vary depending upon the size of the tube and the material forming the tube. For example, one type of blade may be used to sever steel bars and a different blade used to sever aluminum bars.

The saw blade 308, belt 310, sprocket 312 and motor 314 are mounted to a plate or arm 316 that is pivoted at one end 318 to a bracket fixed to the underside of the platform 304. The opposite end 320 of the arm 316 is attached to a pneumatic actuator 322 that is secured to the frame 302. Upon receiving an appropriate control signal from the controller 120, the actuator 322 raises the arm 316 with respect to the platform 304 such that the rotating saw blade 308 passes through the slot 306 in the platform and into cutting engagement with the tube T. After cutting the tube T, the actuator 322 lowers the arm 316 and saw blade 308 so that the tube formed by station 110 can slide along the platform 304. As indicated schematically in the Figures, a valve is provided to control the actuator 322 in order to control the speed at which the saw blade is moved into the tube. The valve controls operation of the pneumatic actuator upon receiving command signals from the controller 120.

A rod 324 is fixed to the platform 304 and the arm 316 to limit movement of the arm in the downward direction. In the illustrated embodiment, the rod 324 has a nut 326 threaded on its end to abut the arm 316 in its lowered position. Another nut preferably is provided on the rod 324 to abut the arm in its raised position. It should be recognized that mechanisms other than that illustrated could be used to limit movement of the arm 316.

A clamping mechanism 330 is provided on the upper surface of the platform 304 to hold the tube in position to be cut by the saw blade 308. The mechanism 330 comprises a fixed clamp member 332 and a movable clamp member 334. An actuator 336 is secured at an end 338 to the platform and attached at an opposite end 340 to the movable clamp 334. The clamp members 332, 334 have slots or grooves passing through a portion of their height and the saw blade 308 passes through such grooves upon being raised by the actuator 322. The tube exits the station 110 and slides next to (preferably without contacting) the fixed clamp member 332. When the tube has moved along the stock travel path such that the area of the tube to be cut is located above the slot 306 in the platform 304, the actuator 322 moves the saw blade 308 upward to sever the tube to form a muntin bar having a desired length. The slots are preferably formed in the middle area of the clamp members 332, 334 so that the tube is supported on both sides of the cut made by the saw blade 308.

The Muntin Bar Handling Station 114

The invention includes a muntin bar handling station for receiving the muntin bar exiting the third forming station 112 and moving the bar away from the stock travel path P. This permits subsequently formed muntin bars to exit the third forming station and also may serve to sort and move the muntin bars to a desired area (not shown).

Figure 12C:
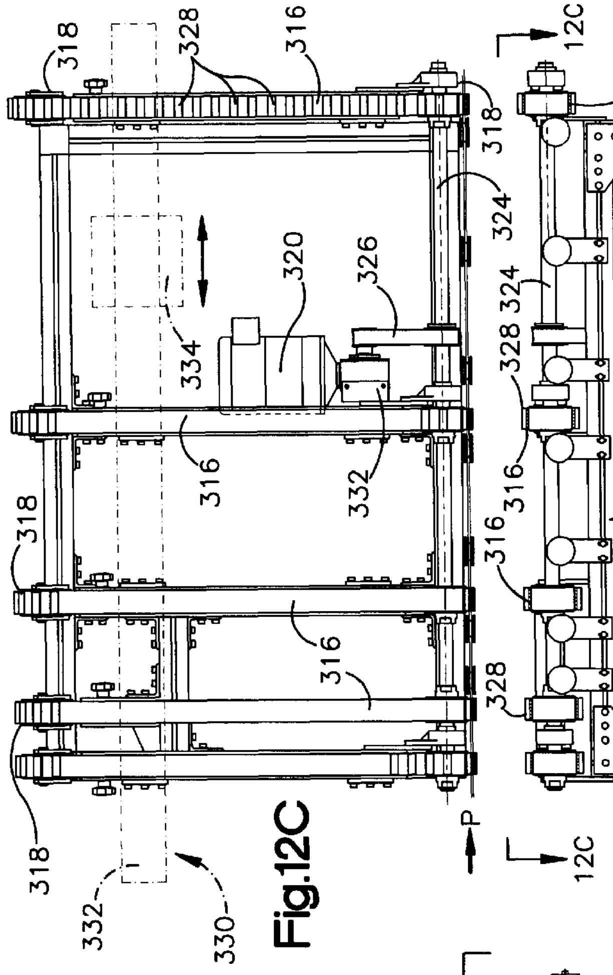
FIGS. 12A–12C are, respectively, an enlarged end elevation view, a rear elevation view, and a plan view of a muntin bar handling station forming part of the production line of FIG. 5, the handling station including an optional adhesive applicator.
Figure 12B:
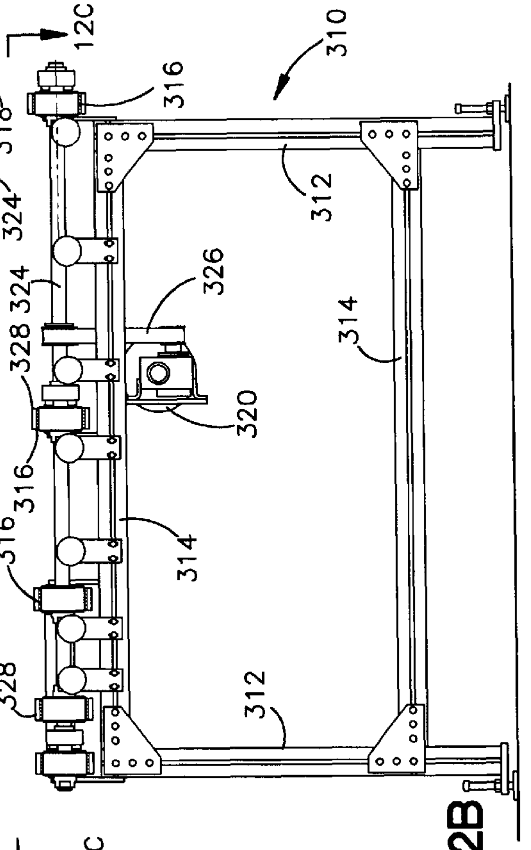
Figure 12A:
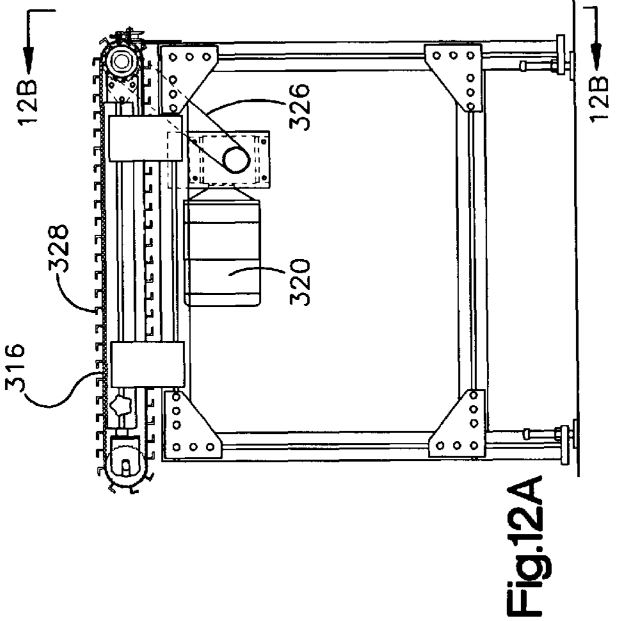

In the preferred embodiment, as seen in FIGS. 12A–12C, the muntin bar handling station is indicated generally by reference numeral 114 and comprises a conveyor to move the muntin bars away from the stock travel path P. The illustrated conveyor comprises a frame 310 with posts 312 and rails 314 supporting a plurality of conveyor belts 316 that extend across the upper portion of the conveyor frame, the belts 316 being reeved around sprockets or pulleys 318 rotatably mounted to the frame. A motor 320 drives a gearbox 322 and a drive belt 326 that rotates a drive shaft 324, which in turn rotates the sprockets 318 to drive the conveyor belts 316. The conveyor belts 316 carry grasping elements of some form to engage the muntin bar. In the preferred embodiment, the elements are hooks 328 extending from the surface of the belts 316. As the belts are driven in a direction transverse to the stock travel path, the hooks 328 pick up a muntin bar that has been severed at the station 112 and carry it away from the stock travel path P. It should be recognized that devices other than that illustrated may be used for handling the muntin bars exiting station 112.

The muntin bar handling station 114 may be provided with an optional adhesive applicator for applying a suitable adhesive material to the notches in the individual muntin bars. An adhesive applicator indicated by reference numeral 330 is shown schematically and preferably comprises a track or guide 332 and an applicator head movably mounted on the track. The applicator 332 is moved along the track to overlie the notches formed in the individual muntin bars being carried by the conveyor belts 316 and is activated to deposit adhesive in the notches. Any suitable means for moving the adhesive applicator along the track may be used, for example, a rack and pinion drive, a belt drive, a lead screw assembly, etc.

The Controller Unit 120

In the preferred embodiment of the invention, the controller unit 120 comprises a personal computer having a display monitor, an operator accessible keyboard, and a central processing unit (CPU) which governs operation of the production line 100. The CPU includes a programmable microprocessor that executes a control program containing a schedule of operations to be performed to produce a batch of individual muntin bars suitable for subsequent assembly into a grid. The microprocessor controls feeding the stock from supply station 102, and processing of the stock at stations 104, 110, 112 and 114. FIG. 6 shows schematically a link or line of communication between each of the various stations and the controller 120. The control program thus dictates the production schedule of the muntin bars manufactured by the production line 100.

Accordingly, when the muntin bars for a given size insulating glass unit, such as the unit 10 of FIG. 1, are to be produced, the ribbon stock is fed from supply station 102 and a signal is generated by the loop feed sensor 108 and transmitted to the controller unit 120. The controller unit 120 speeds up, slows or stops the supply station motor depending on the condition of the stock loop at the sensor 108. However, once the production line 100 is in operation, feed of stock through the production line generally is governed by the controller stopping or activating the rolling mill.

The stock passes through the first forming station 104 with the controller 120 monitoring the feed rate of stock. The controller 120 stops the rolling mill during activation of the punching unit 162. The punching unit 162 is provided with a sensor (not shown) that detects when the punch 175 has been raised to its upper position, and a sensor (not shown) that detects when the punch 175 has been lowered to its lower position. After the unit receives a punch command from the controller 120, the sensors detect whether the punch has reached its lower position and then raised to its upper position. If so, the rolling mill is activated to resume feeding the stock through the production line. If not, the rolling mill is not activated.

After the stock has been punched as detected by the sensors, operation of the rolling mill resumes and the notched stock passes through the mill and is formed into a tube. The tube exits through the nip between the rolls of the final roll assembly 212 (i.e., the final pass of the rolling mill) and engages a sensor, e.g., rotary encoder 300. The encoder 300 has a roller with a frictional outer surface and is rotated upon being contacted by the tube exiting the rolling mill. A pair of V-shaped rollers are preferably disposed above the encoder roller so that substantially equal pressure is applied to the top and bottom of the tube exiting the station 110.

The encoder 300 generates a signal that is transmitted to the controller 120 indicating the position of the tube passing through the rolling mill, as well as the position of the ribbon stock passing through the punching unit. This information is used to control movement of the stock through the production line 100 to ensure that the notches are properly located in the stock, and that the third forming station 112 cuts the tube at correct locations to produce individual muntin bars having a correct length. The encoder 300 transmits a signal that correctly indicates the position of stock in the line even if slippage in the line occurs, due to the encoder signal being generated by physical contact with the tube.

The controller 120 controls the third forming station 112 to sever the tube into an appropriately sized individual muntin bar. When the tube is in position at the station 112, the saw is moved upward through the slot 306 in the platform 304 and severs the tube. A first sensor (not shown) is located beneath the conveyor belt adjacent the station 112 and detects whether the severed muntin bar is in a payout position, a position where the bar needs to be removed from station 112 by the conveyor. If the bar is in such a payout position, the controller stops the rolling mill to prevent a tube being formed and fed to the station 112 before the severed muntin bar has been removed by the conveyor. A second sensor (not shown) is mounted beneath the conveyor belt adjacent the station 112 and detects whether the conveyor belts are in a position so that the hooks 328 will engage the severed bar upon actuation of the conveyor. If the belts are not in proper position, the rolling mill is stopped and not activated until the belts have been moved to a muntin bar engaging position. A third sensor (not shown) is mounted beneath the conveyor belt adjacent the end of the conveyor disposed away from the stock travel path P and detects whether the conveyor is fully loaded with muntin bars. If such condition is detected, the rolling mill is stopped until at least some of the muntin bars are removed from the conveyor belts. The conveyor may be operated to perform various functions, for example, carrying the muntin bars to another location (not shown) where they are assembled into a grid for use in an insulating glass unit, or carrying the muntin bars to one of different storage locations where they are stored according to their size, color or finish, etc.

If the production line is provided with an adhesive applicator for applying adhesive to the notches in the muntin bars, the controller 120 is used to control movement of the applicator head along the track as well as activation of the head to deposit adhesive in the notches.

The controller 120 may carry out a computer integrated manufacturing scheme that automatically produces muntin bars according to pre-programmed or custom programmed production schedules.

Alternative Embodiments

Figure 13:
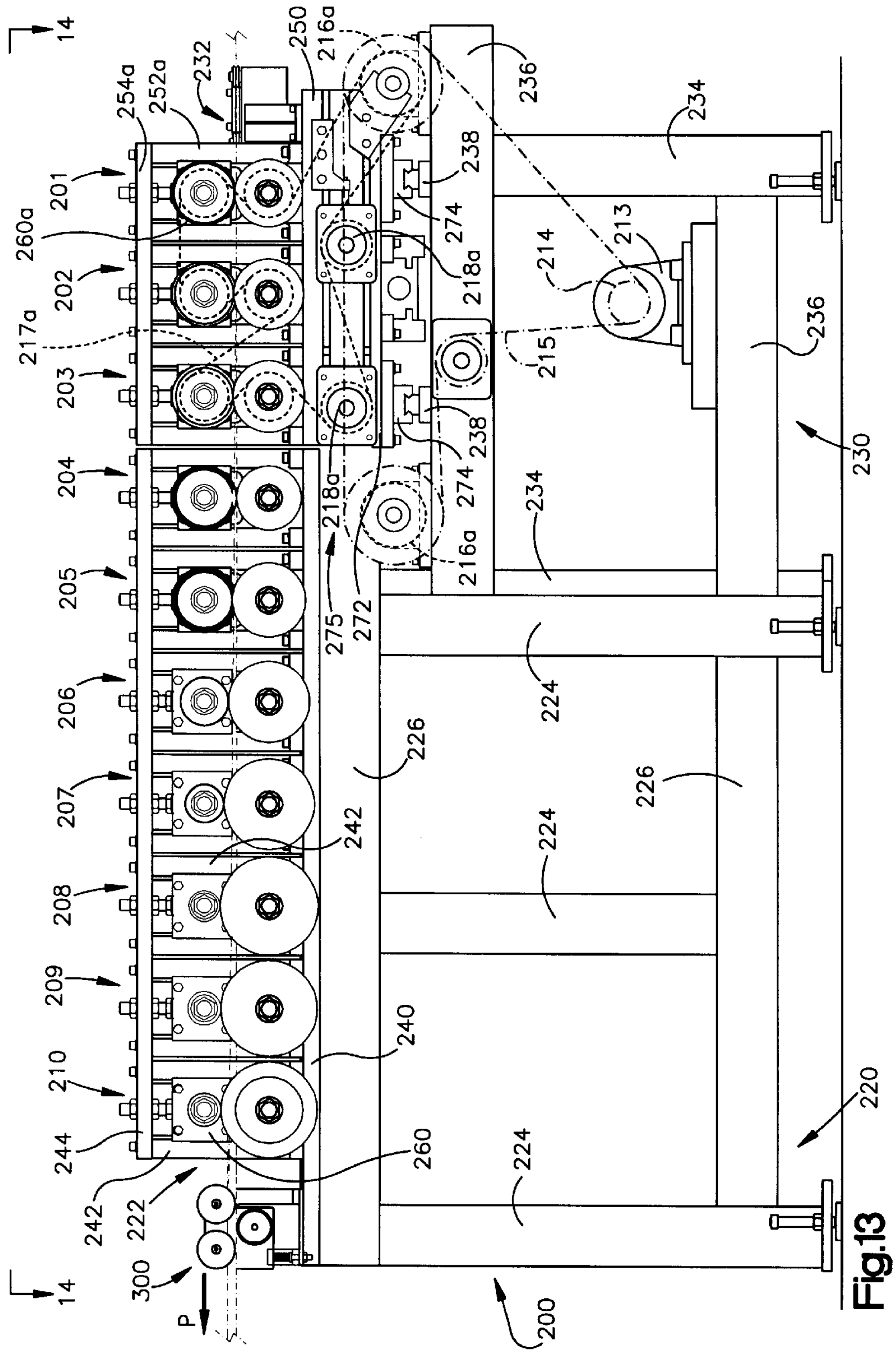
FIG. 13 is an enlarged front elevation view of a second forming station constructed according to an alternative embodiment of the invention.
Figure 14:
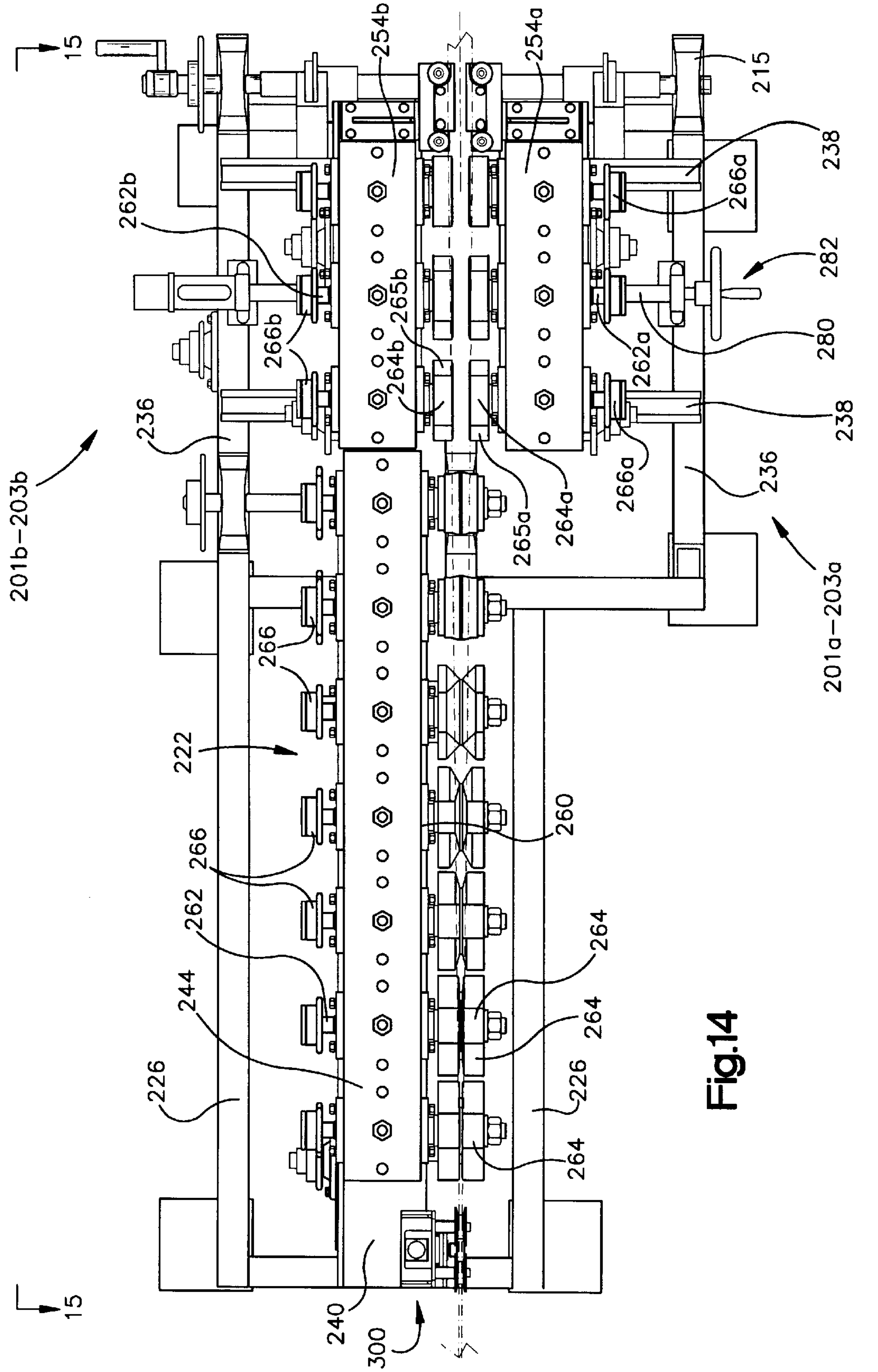
FIG. 14 is a plan view of the forming station of FIG. 13 seen approximately from the plane indicated by the line 13—13 in FIG. 13.
Figure 15:
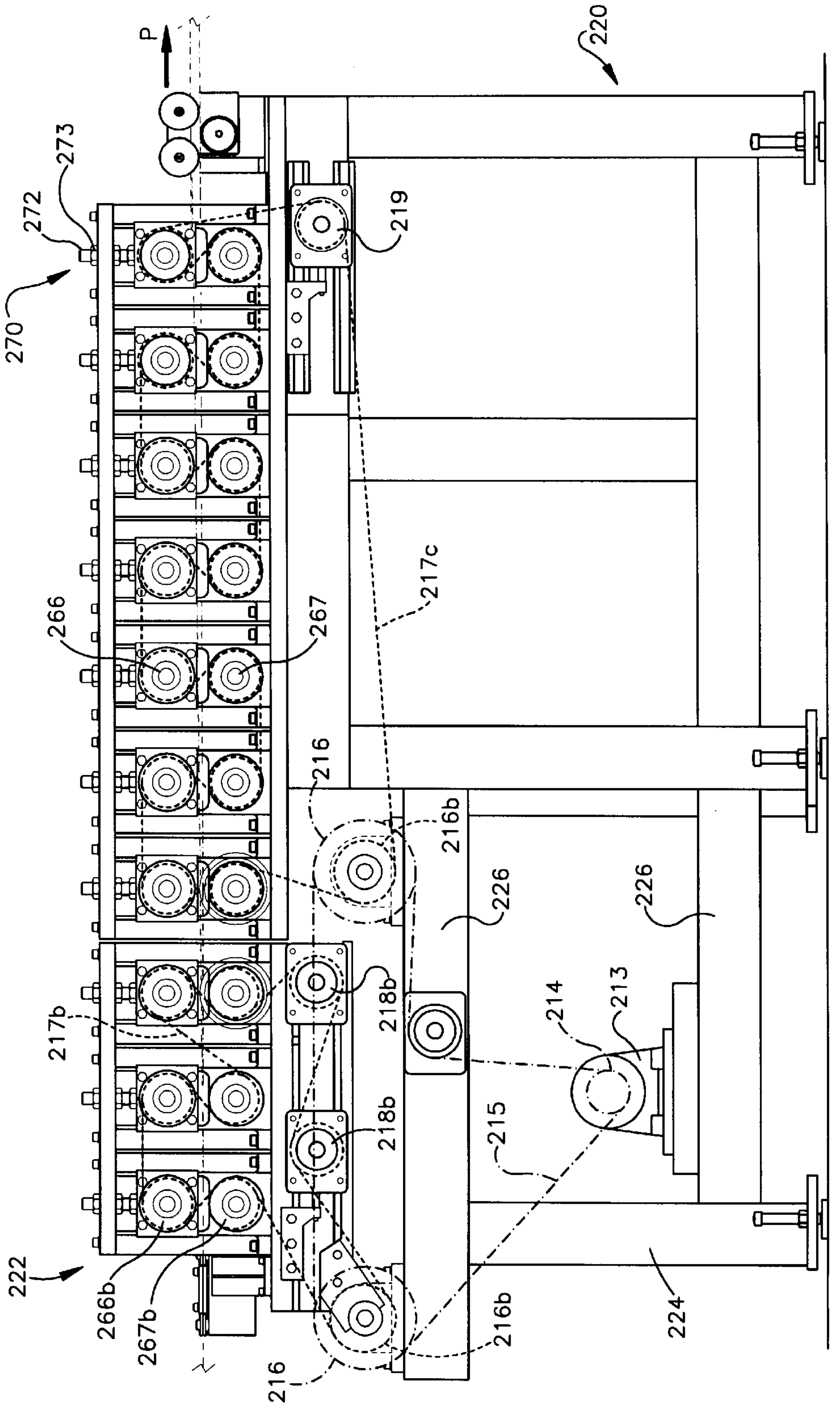
FIG. 15 is an enlarged rear elevation view of the forming station of FIG. 13.

Referring to FIGS. 13–15, an alternative embodiment of the second forming station 110 is shown and includes an adjustment mechanism for adjusting the roll assemblies to enable the station 110 to roll form different width ribbon stock. The rolling mill of this illustrated embodiment includes ten roll assemblies 201–210; however, it should be recognized that it may include twelve assemblies as in the previous embodiment, or any other number of assemblies depending upon the particular application. The portion of the rolling mill comprising roll assemblies 201–203 in this embodiment is separate from the portion comprising roll assemblies 204–210. The roll assemblies 201–203 in this embodiment comprise side-by-side roll assemblies 201*a*–203*a* and 201*b*–203*b* that are movable toward and away from each other.

The base portion of the rolling mill frame may be viewed as comprising a section 220 which extends beneath roll assemblies 204–210, and a section 230 which extends beneath roll assemblies 201–203 and comprises legs 234 and support rails 236. Similarly, the roll supporting frame assembly may be viewed as comprising a section 222 which extends beneath roll assemblies 204–210, and a section 232 which extends beneath roll assemblies 201–203. The construction of the rolling mill section comprising roll assemblies 204–210 is as described above in connection with the preferred embodiment.

The roll supporting frame section 232 extending beneath roll assemblies 201–203 comprises two roll supporting portions disposed side-by-side in essentially parallel fashion. These two roll supporting portions include lower support beams 250*a*, 250*b* and upper support beams 254*a*, 254*b*, with two series of spaced apart vertical stanchions 252*a*, 252*b* respectively disposed therebetween. Each roll assembly 201–203 includes two side-by-side pairs of vertically aligned rolls, one pair received between the stanchions in each series. The roll pairs of the respective roll assemblies 201–203 comprise bearing housings 260*a*, 260*b*, upper and lower roll shafts 262*a*, 262*b* extending through a corresponding bearing housing, upper stock forming rolls 264*a*, 264*b* on the inwardly projecting ends of the upper roll shafts, and lower stock forming rolls 265*a*, 265*b* on the inwardly projecting ends of the lower roll shafts. A drive pulley 266*a* is disposed on the outboard ends of each shaft 262*a*, while a drive pulley 266*b* is disposed on the outboard ends of each shaft 262*b*. The bearing housings 260*a*, 260*b* are provided with a roll position adjustment mechanism, constructed in accordance with the mechanism 270 described above.

The two side-by-side portions of roll supporting frame section 232 are movable toward and away from each other to vary the spacing between the adjacent roll pairs of each roll assembly 201–203. In particular, the roll pairs 201*a*–203*a* carried by beam 250*a*, stanchions 252*a* and support bar 254*a* and the roll pairs 201*b*–203*b* carried by beam 250*b*, stanchions 252*b* and support bar 254*b* are movable in a lateral direction toward or away from each other. The roll supporting assembly 232 is provided with transverse beam-like trackways 238 extending between the rails 236 at locations spaced apart along the stock travel path P to facilitate lateral adjustment of roll assemblies 201–203. A network of stiffening elements (not shown) interconnects the rails 236, trackways 238 and legs 234.

An actuating assembly, indicated at 275, is provided to move the roll assemblies 201*a*–203*a* toward or away from 201*b*–203*b*. The assembly 275 includes a base 276 that carries spaced apart linear bearings 277 which slide along the trackways 238 so that the beams 250*a* and 250*b* move laterally toward and away from the stock travel path P. The actuating assembly 275 comprises a jackscrew 280 having right and left hand threaded sections extending between lateral sides of the roll supporting frame section 232, and a drive transmission 282 attached to the jackscrew. The jackscrew is mounted in bearings fixed to the rails 236 with its axis of rotation extending laterally across the rolling mill. The lower support beams 250*a*, 250*b* disposed on opposite sides of the stock travel path P are respectively threaded onto the right and left hand jackscrew threads. As such, when the jackscrew 280 is rotated, e.g., by hand crank 282, the beams and their roll pairs are moved laterally toward each other, while jackscrew rotation in the opposite direction moves the roll pairs away from each other. The beams 250*a*, 250*b* move along the trackways 238 with the aid of the linear bearings 277 during their position adjustment. The drive transmission 282 is preferably a hand crank although other drive mechanisms may be used.

The second forming station embodiment of FIGS. 13–15 includes a drive transmission assembly which is similar to that described above in connection with the first embodiment. However, in this embodiment separate drive transmission assemblies are provided for driving the roll pairs of assemblies 201*a*–203*a* and 201*b*–203*b*. As seen in FIG. 15, which shows the rear of the rolling mill, the main drive transmission assembly comprises a motor 213 disposed on the rear side of the rolling mill, and a sprocket 214 rotated by the motor. A main drive chain 215 passes around the sprocket 214, a pair of drive sprockets 216, and an idler sprocket disposed intermediate the sprockets 216. The sprockets 216 are attached to a pair of shafts extending across the rolling mill which rotate upon actuation of the motor 213.

FIG. 15 also shows the drive for the roll assemblies 201*b*–203*b*, which comprises a secondary drive chain 217*b* that passes around two sprockets 216*b* respectively fixed inwardly on the two shafts on which the sprockets 216 are fixed. The drive chain 217*b* also passes around a pair of idler sprockets 218*b*, as well as the sprockets 266*b*, 267*b* carried by the upper and lower rolls of each roll assembly 201*b*–203*b*. Thus, rotation of the sprockets 216 via motor 213 and main drive chain 215 rotates secondary drive chain 217*b* via sprockets 216*b* to rotate the rolls 264*b*, 265*b* of each assembly 201*b*–203*b*.

Referring to the front side of the rolling mill as seen in FIG. 13, which shows the drive for the roll assemblies 201*a*–203*a*, another secondary drive chain 217*a* passes around two sprockets 216*a* respectively fixed to the two shafts on which sprockets 216*b* are fixed. The drive chain 217*a* also passes around a pair of idler sprockets 218*a*, as well as the sprockets 266*a*, 267*a* carried by the upper and lower rolls of each roll assembly 201*a*–203*a*. Thus, rotation of the sprockets 216 via motor 213 and main drive chain 215 also rotates secondary drive chain 217*a* via sprockets 216*a* to rotate the rolls 264*a*, 265*a* of each assembly 201*a*–203.

The rolls of roll assemblies 204–212 are driven upon actuation of the motor 213 via another secondary drive chain 217*c* (FIG. 15). The drive train 217*c* passes around one of the sprockets 216*b* (the one disposed under roll assembly 204) and idler sprocket 219, and the sprockets 266, 267 of roll assemblies 204–210. As such, upon actuation of motor 213 the drive chain 217*c* rotates the rolls 264, 265 of assemblies 204–210 in unison with the rolls of assemblies 201–203. It should be noted that while the embodiment of FIGS. 13–15 is illustrated as including ten roll assemblies, it could include more or less than ten.

In the embodiment with an adjustable rolling mill the rolls of roll assemblies 201–203 are movable laterally toward or away from each other to accommodate different width ribbon stock. The size of the edge panels 184*a*, 184*b* (and central panel 188) typically are the same for different size muntin bars. In other words, referring to FIG. 2, it is the dimension of major panels 186*a*, 186*b* that varies between different width muntin bars. Accordingly, adjusting the position of the roll assemblies 201–203 accommodates different size ribbon stock by varying the distance between the fold lines 182*a* and 182*c*, and 182*b* and 182*d* of the stock (FIGS. 3 and 4).

The first forming station 104 preferably is designed to remove material from the midpoint of the ribbon stock regardless of the distance from the midpoint of the stock to the edges 180*a* or 180*b*. Thus, the same mechanism, e.g. punching unit 162, removes the correct amount of material for different widths of sheet stock in the embodiment of FIGS. 13–15.

Figure 16:
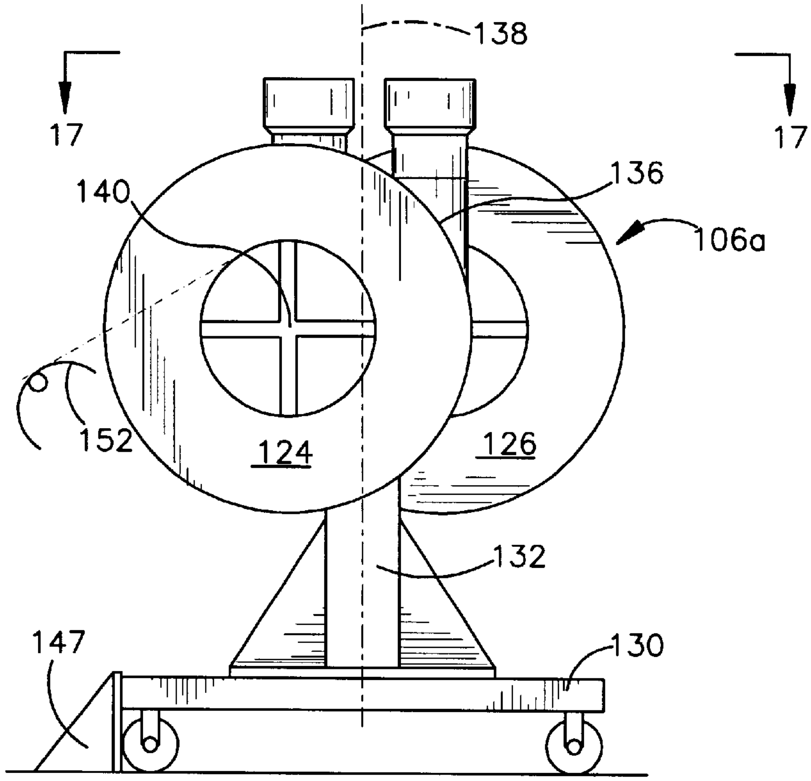
FIG. 16 is an enlarged front elevation view of a stock supply station constructed according to an alternative embodiment of the invention.
Figure 17:
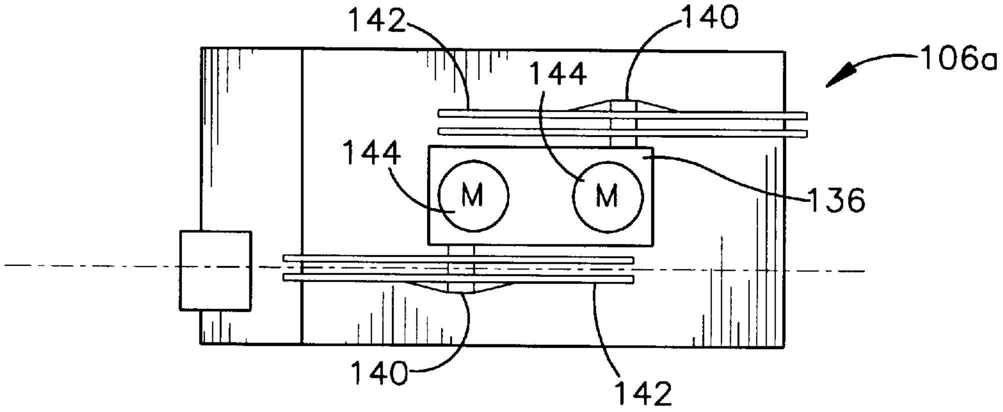
FIG. 17 is a plan view of the stock supply station of FIG. 16 seen approximately from the plane indicated by the line 17—17 in FIG. 16.

FIGS. 16 and 17 show an alternative construction for a ribbon stock support 106*a* that may be used in lieu of the support 106 discussed above in connection with the supply station 102. The support 106*a* comprises a caster mounted support dolly 130 having a vertical support column 132 anchored to it and extending upwardly to a coil support unit. The coil support unit comprises a support housing 136 mounted on the column 132 by a bearing (not shown) which enables the housing to be rotated relative to the column and dolly about a vertical axis 138 extending through the column in order to adjust the position of the coil. A coil-supporting stub axle assembly 140 projects from the housing 136 to support each coil of stock material.

Each axle assembly 140 is provided with an expandable mandrel 142 at its projecting end on which the coil is received. A drive motor 144 drives each axle assembly 140 to feed stock from the station 102. A drive transmission (not shown) within the housing 136 couples the motor to its driven axle. The expandable mandrel 142 is adjustable to receive coils having different widths depending upon the size of the muntin bars being produced by the production line 100. The housing 136 is rotated about the bearing axis 138 to place one coil in reserve and position a second coil for feeding the production line. A suitable latching mechanism may be provided to lock the housing 136 in place when a coil has been positioned for supplying stock to the line. When stock from the one coil is required for production, the latching mechanism is operated to free the housing 136 for rotation about the axis 138 to bring the one coil into position for feeding the line. The latching mechanism is then operated to lock the housing in place. The motor 144 is an electrically powered A.C. motor (power lines are not illustrated) which positively drives and brakes the axle assembly under control of the controller unit 120. The dolly 130 engages a floor mounted stop bracket 147 when positioned for feeding stock so that the feed coil is positively positioned during muntin bar production.

During the time stock is payed off of one coil for producing muntin bars, the other coil may be replaced, if desired, to provide another width of stock material which can be held in reserve until needed. Alternatively, the support 106 may be used to feed stock for producing only one size muntin bar, the second coil serving as a reserve supply of stock to reduce system downtime upon reaching the end of the first coil.

As described above, the invention is preferably used to form muntin bars from ribbon stock that is notched while in its planar condition and then formed into a tube that is severed to form an individual muntin bar. However, it also is possible to modify the invention to form muntin bars from ribbon stock that is first formed into a tube and then notched.

Figure 18C:
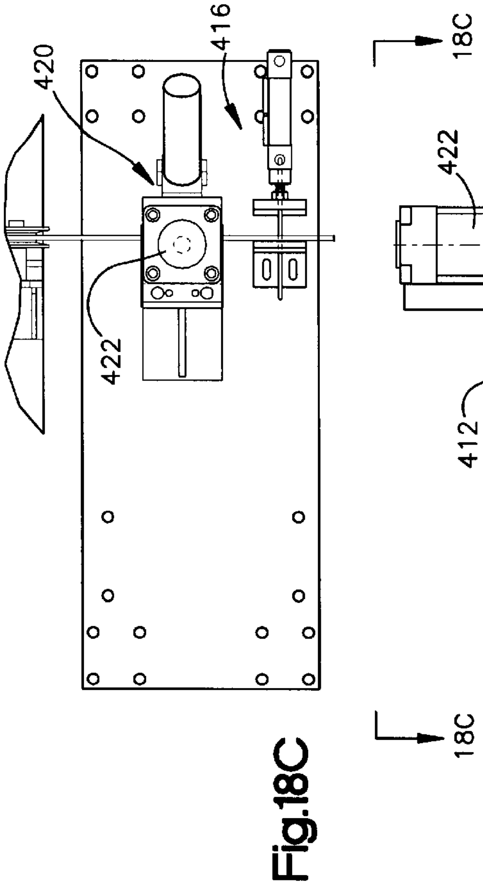
FIGS. 18A–18C are, respectively, an enlarged front elevation view, end elevation view, and plan view of a mechanism constructed according to an alternative embodiment of the invention for forming a muntin bar from a tube that has not been notched.
Figure 18B:
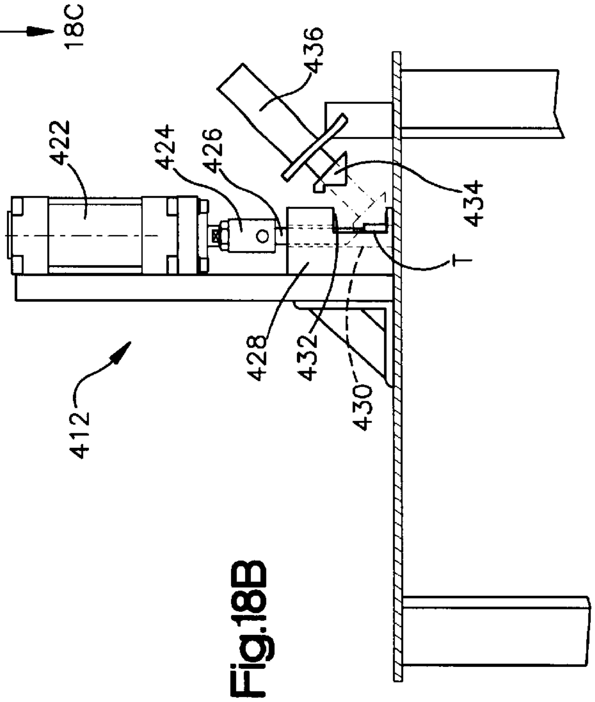
Figure 18A:
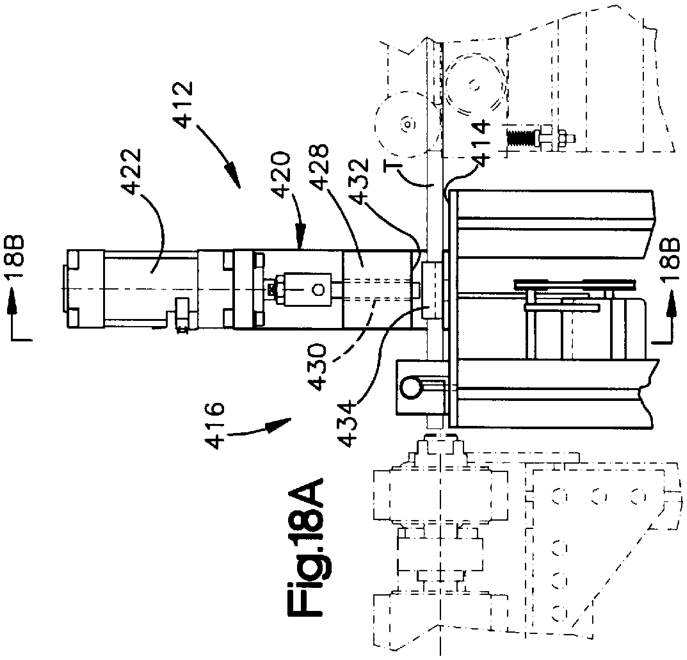

In this embodiment of the invention, the first forming station 104 is omitted and the ribbon stock is fed from the loop feed sensor 108 into the second forming station 110. The third forming station preferably is modified as illustrated in FIGS. 18A–18C. The station, indicated by reference numeral 412, includes a punch unit 420 constructed to form a notch in the tube that exits the third forming station 110. As described above with respect to the first forming station 104, alternative mechanisms may be used to notch or otherwise process the tube to include muntin bar engaging structure, for example, broaching, swedging, routing, shearing, etc., processes.

The modified forming station 412 includes a platform 414 and a severing mechanism indicated generally by reference numeral 416 which is constructed in accordance with the above description of forming station 112. The punch unit 420 includes a ram assembly 422 that drives a member 424 attached to a punch 426. The punch 426 has a sharpened chisel-shaped edge configured to drive through the tube T to remove a portion of the tube and form a notch 190 such as that described above in connection with FIG. 2. The punch unit comprises a punch guide block 428 that is provided with a vertical punch bore 430 through which the punch 426 passes.

A tube receiving recess 432 if formed in the punch guide block 428 and extends horizontally across the face of the block and intersects the punch bore 430. When the tube T is inserted into the recess 432 it extends into the punch bore 430 a depth of about one-half the thickness of the tube. A clamp member 434 is movable upon actuation of a cylinder 436 to clamp the tube within the recess 432 during the punching operation.

The ram assembly 422 receives command signals from the controller 120 so that when the portion of the tube T to be notched is located in the recess 432 and beneath the punch 426, the rolling mill is stopped and the ram assembly 422 is activated to drive the punch down through the tube T.

While the invention has been described in detail with respect to the preferred embodiments thereof, those skilled in the art will appreciate that many changes and modifications may be made thereto without departing from the spirit or scope of the invention as defined in the claims.

What is claimed is:

1. An apparatus for making muntin bars comprising:

a) a support for a supply of ribbon stock;

b) a notching device for receiving ribbon stock from the supply, the notching device having a punch engageable with the ribbon stock to form notches spaced along the length of the ribbon stock;

c) a roll forming machine adapted to receive ribbon stock from the notching device and form a hollow muntin bar having notches located therein; and d) a severing device for severing the muntin bar at predetermined locations to form individual notched muntin bars.

2. The apparatus of claim 1, further comprising a sensor for sensing the length of ribbon stock delivered to the notching device, and a process controller associated with the notching device, roll forming machine, and severing device, wherein the sensor provides signals to the controller indicating the sensed ribbon length, and the process controller provides control signals for enabling operations at said notching device and said severing device.

3. The apparatus of claim 1, further comprising an adhesive applicator for applying adhesive to the notches of the individual muntin bars.

4. The apparatus of claim 1, further comprising a conveyor for conveying the individual muntin bars away from the adhesive applicator.

5. Apparatus for making muntin bars comprising:

a) a supply of thin sheet material having a finished surface in the form of a oiled ribbon;

b) a drive for uncoiling the ribbon and feeding the ribbon along a travel path;

c) a ribbon punching mechanism positioned with respect to the travel path that punches the ribbon at first precisely determined locations along the ribbon to form spaced cut-outs that extend inward from an edge of the ribbon and define a region of intersection with one or more transversely extending muntin bars in a muntin bar grid;

d) a roll forming station spaced downstream along the travel path from the ribbon punching mechanism, said roll forming station including a succession of forming rolls having forming roll nips that engage the ribbon to produce a hollow muntin bar tube defining a closed, cross-sectional shape having openings therein at the first precisely determined locations; and e) a muntin severing apparatus that severs the muntin bar tube at second precisely determined locations to form completed muntin bars.

6. The apparatus of claim 5 wherein the forming rolls comprise side-by-side pairs of vertically aligned upper and lower rolls, and the roll forming station comprises means for adjusting the rolls toward and away from each other to receive a particular size sheet material.

7. The apparatus of claim 5 wherein the ribbon punching mechanism punches rectangular notches in the ribbon.

8. The apparatus of claim 5 further comprising a dispenser for applying adhesive to the muntin bars at the locations of the spaced cut outs.

9. The apparatus of claim 5 additionally comprising a clamp for clamping the muntin bar tube before the severing apparatus separates an end of the muntin bar tube.

10. The apparatus of claim 9 wherein the muntin severing apparatus includes a saw for cutting off the muntin bar tube.

11. The apparatus of claim 5 additionally comprising a controller for operating the conveyor to produce a batch of muntin bar tubes that make up a muntin bar grid.

* * * * *